United States Patent
Lane et al.

(10) Patent No.: US 9,818,552 B2
(45) Date of Patent: Nov. 14, 2017

(54) ADDITIVES FOR REDUCING ESR GAIN IN ELECTROCHEMICAL DOUBLE LAYER CAPACITORS

(71) Applicant: Ioxus, Inc., Oneonta, NY (US)

(72) Inventors: George Hamilton Lane, St. Helens (AU); Ken Rudisuela, Grimsby (CA); Susan Carol Donadio, Oneonta, NY (US)

(73) Assignee: Ioxus, Inc., Oneonta, NY (US)

( * ) Notice: Subject to any disclaimer, the term of this patent is extended or adjusted under 35 U.S.C. 154(b) by 103 days.

(21) Appl. No.: 14/605,114

(22) Filed: Jan. 26, 2015

(65) Prior Publication Data

US 2016/0217937 A1     Jul. 28, 2016

(51) Int. Cl.
| | |
|---|---|
| *H01G 11/60* | (2013.01) |
| *H01G 11/62* | (2013.01) |
| *H01G 11/64* | (2013.01) |
| *H01G 11/84* | (2013.01) |

(52) U.S. Cl.
CPC .......... *H01G 11/60* (2013.01); *H01G 11/62* (2013.01); *H01G 11/64* (2013.01); *H01G 11/84* (2013.01); *Y02E 60/13* (2013.01)

(58) Field of Classification Search
CPC ........ H01G 11/60; H01G 11/66; H01G 11/38; H01G 11/1164; H01G 11/64; H01G 11/52; H01G 11/62; H01G 11/86
See application file for complete search history.

(56) References Cited

U.S. PATENT DOCUMENTS

| | | | |
|---|---|---|---|
| 3,489,663 A | 1/1970 | Bayer et al. | |
| 4,528,254 A | 7/1985 | Wolf et al. | |
| 4,725,927 A | 2/1988 | Morimoto et al. | |
| 7,755,879 B2 | 7/2010 | Yoshida et al. | |
| 7,967,874 B2 | 6/2011 | Nanno et al. | |
| 8,760,851 B2 * | 6/2014 | Signorelli | H01G 11/32 361/502 |
| 9,190,695 B2 | 11/2015 | Okamoto et al. | |
| 9,536,678 B2 | 1/2017 | Lane et al. | |
| 2003/0202316 A1 | 10/2003 | Kawasato et al. | |

(Continued)

FOREIGN PATENT DOCUMENTS

| | | | |
|---|---|---|---|
| AU | WO 2012151618 A1 * | 11/2012 | ........ H01M 10/0567 |
| EP | 0609101 A1 | 8/1994 | |

(Continued)

OTHER PUBLICATIONS

International Search Report and Written Opinion for International Application No. PCT/US16/14221, dated Jan. 21, 2016.

(Continued)

*Primary Examiner* — David M Sinclair
(74) *Attorney, Agent, or Firm* — Cooley LLP

(57) ABSTRACT

The present disclosure relates to electric double layer capacitors (EDLCs) that include an alkylating or arylating agent additive capable of scavenging nucleophilic species generated during operation of the EDLC. The additives for the electric double layer capacitors (EDLCs) including an alkylating or arylating agent are described herein. The alkylating or arylating reagent comprises a compound of the formula I:

$$R-X \qquad (I)$$

wherein R and X are described herein.

35 Claims, 17 Drawing Sheets

(56) References Cited

U.S. PATENT DOCUMENTS

| | | | |
|---|---|---|---|
| 2006/0147808 A1 | 7/2006 | Xiao et al. | |
| 2006/0274475 A1 | 12/2006 | Chiba | |
| 2009/0134851 A1 | 5/2009 | Takeda et al. | |
| 2010/0028783 A1* | 2/2010 | Nah | H01M 10/0525 429/330 |
| 2012/0088160 A1 | 4/2012 | Zhang et al. | |
| 2012/0156528 A1 | 6/2012 | Cooley | |
| 2013/0133923 A1 | 5/2013 | Leis et al. | |
| 2014/0042988 A1* | 2/2014 | Kuttipillai | H01G 11/30 320/167 |
| 2014/0098466 A1 | 4/2014 | Bilyk et al. | |
| 2015/0016021 A1 | 1/2015 | Lane et al. | |

FOREIGN PATENT DOCUMENTS

| | | |
|---|---|---|
| KR | 10-2011-0136085 | 12/2011 |
| WO | WO 2007/072815 | 6/2007 |
| WO | WO 2012/017998 | 2/2012 |
| WO | WO 2013126915 A1 * | 8/2013 ............. H01G 11/78 |
| WO | WO 2015/006072 | 1/2015 |

OTHER PUBLICATIONS

3M Novec Fluorosurfactant FC-4430, Project Information, Dec. 2010, 4 pages.

International Search Report and Written Opinion for International Application No. PCT/US2014/044585, dated Oct. 14, 2014, 9 pages.

Supplementary European Search Report for European Application No. 14823818.1, dated Jul. 20, 2017, 7 pages.

* cited by examiner

ADDITIVES FOR REDUCING ESR GAIN IN ELECTROCHEMICAL DOUBLE LAYER CAPACITORS

BACKGROUND

The present disclosure relates to electric double layer capacitors (EDLCs) that include an alkylating or arylating agent additive capable of scavenging nucleophilic species generated during operation of the EDLC. Capacitors are typically used as components of electric circuits that are capable of holding an electric charge electrostatically, and discharging it rapidly. EDLCs, also known as supercapacitors or ultracapacitors, are a type of capacitor that have two electrodes separated by an ion permeable membrane (separator), and an electrolyte solution electrically connecting both electrodes.

Although EDLCs typically have lower energy densities than traditional batteries, they often can have much higher power densities. For instance, some EDLCs can have power densities up to 100 times higher than traditional batteries. This allows them to be used for many commercial applications such as, electric and hybrid automobiles.

One drawback of current EDLCs is that nucleophilic species can be generated in the electrolyte solution as a consequence of the normal functioning of the cell. For instance, trace hydroxide ion derived from adventitious water within an EDLC electrolyte solution may react with tetraethylammonium chloride to produce triethylamine via a Hoffman elimination type-mechanism. The triethylamine, or other nucleophilic species thus generated, can then further react within the cell and impede the EDLC's normal function.

SUMMARY

The present disclosure relates to systems, devices, and methods that include EDLCs having an alkylating agent or arylating agent additive capable of scavenging nucleophilic species generated during operation of the EDLC. In some embodiments, an electrochemical double-layer capacitor includes a cathode, an anode, a separator, an electrolyte, and an additive comprising a compound of formula I:

$$R\text{—}X \qquad (I)$$

In some embodiments, R can be saturated alkyl, unsaturated alkyl, saturated branched alkyl, unsaturated branched alkyl, aryl, heteroaryl, substituted aryl or substituted alkyl, and X can be I, Br, Cl, —$SO_2F$, —$SO_2CF_3$, —$OCH_3$, —$N(SO_2F)_2$, —$N(SO_2CF_3)_2$, —$N(CN)_2$, —$Si(CH_3)_3$, —O—$S(O)_2$—$OCH_3$, —$S(O)_2$—O—$CF_3$, or tosylate. The concentration of the compound of formula I in the electrochemical double-layer capacitor is less than about 10% by volume.

DETAILED DESCRIPTION

The present disclosure relates to systems, devices, and methods that include EDLCs having an alkylating agent or arylating agent additive capable of scavenging nucleophilic species generated during operation of the EDLC. The alkylating or arylating agent may be particularly active at high temperatures and can have the effect of lowering the equivalent series resistance (ESR) gain and lowering the capacitance loss in the EDCLs in comparison to cells that do not have the alkylating or arylating agents. In some embodiments, an electrochemical double-layer capacitor includes a cathode, an anode, a separator, an electrolyte, and an additive comprising a compound of formula I:

$$R\text{—}X \qquad (I)$$

wherein R is saturated alkyl, unsaturated alkyl, saturated branched alkyl, unsaturated branched alkyl, aryl, substituted aryl or substituted alkyl, and X is I, Br, Cl, —$SO_2F$, —$SO_2CF_3$, —$OCH_3$, —$N(SO_2F)_2$, —$N(SO_2CF_3)_2$, —$N(CN)_2$, —$Si(CH_3)_3$, —O—$S(O)_2$—$OCH_3$, —$S(O)_2$—O—$CF_3$, or tosylate. The concentration of the compound of formula I in the electrochemical double-layer capacitor is less than about 10% by volume.

Figure 17:
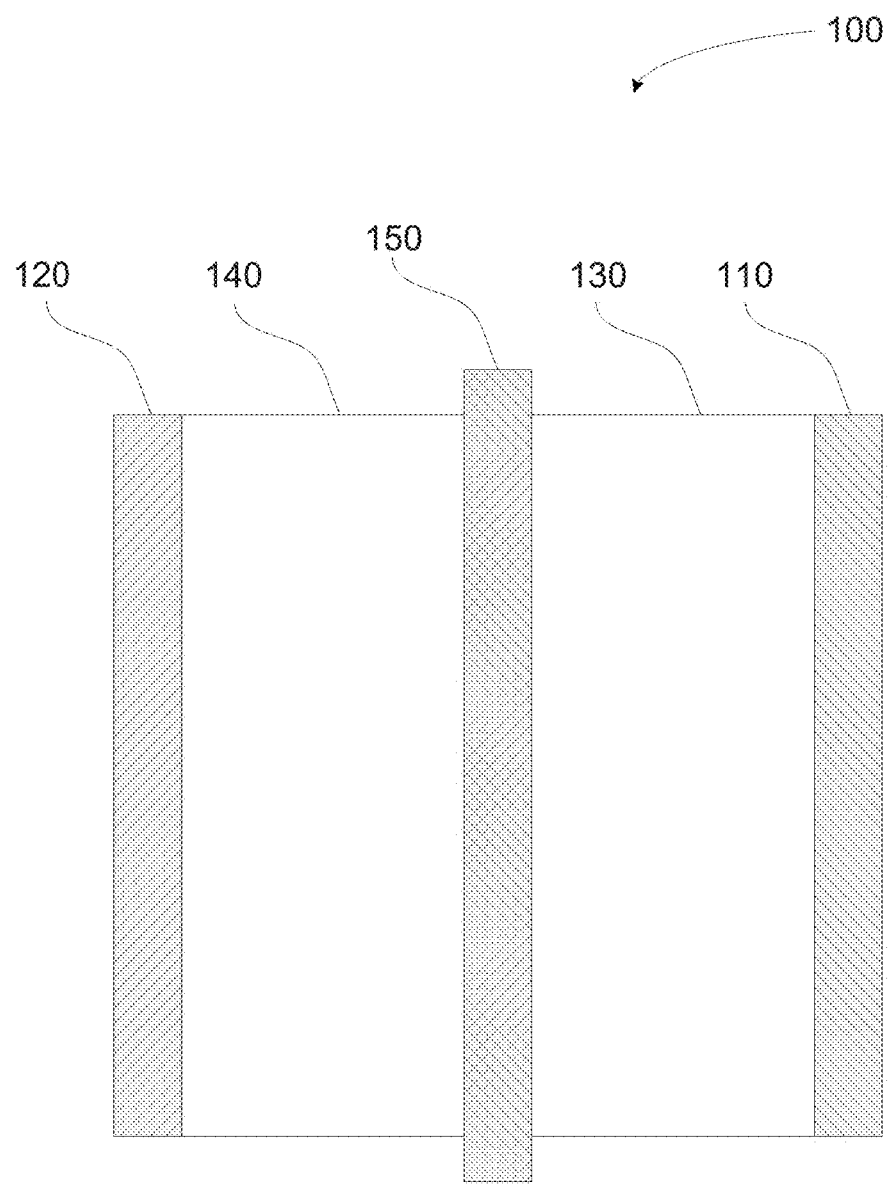
FIG. 17 is a representation of an EDLC according to an embodiment.

FIG. 17 shows a representation of an EDLC 100. The EDLC 100 includes a positive current collector 110, a negative current collector 120, a cathode 130, an anode 140 and a separator 150 disposed between the cathode 130 and the anode 140. In some embodiments, an electrochemical double-layer capacitor includes a cathode, an anode, a separator, an electrolyte, a stabilizer, and an additive comprising a compound of formula I:

wherein R is saturated alkyl, unsaturated alkyl, saturated branched alkyl, aryl, substituted aryl or substituted alkyl, and X is I, Br, Cl, —SO$_2$F, —SO$_2$CF$_3$, —OCH$_3$, —N(SO$_2$F)$_2$, —N(SO$_2$CF$_3$)$_2$, —N(CN)$_2$, —Si(CH$_3$)$_3$, —O—S(O)$_2$—OCH$_3$, —S(O)$_2$—O—CF$_3$, or tosylate. The total concentration of the compound of formula I and the stabilizer in the electrochemical double-layer capacitor is less than or equal to about 10% by volume.

In some embodiments, a method of manufacturing an EDLC cell includes disposing a cathode on a positive current collector, disposing an anode on a negative current collector, disposing a separator between the positive current collector and the negative current collector to form the EDLC cell, disposing the EDLC cell in a container, and infiltrating the EDLC cell with an electrolyte formulation comprising: an ionic species, a solvent, and an additive comprising a compound of formula I:

wherein R is saturated alkyl, unsaturated alkyl, unsaturated branched alkyl, aryl, substituted aryl, or substituted alkyl, and X is I, Br, Cl, —SO$_2$F, —SO$_2$CF$_3$, —OCH$_3$, —N(SO$_2$F)$_2$, —N(SO$_2$CF$_3$)$_2$, —N(CN)$_2$, —Si(CH$_3$)$_3$, —O—S(O)$_2$—OCH$_3$, —S(O)$_2$—O—CF$_3$, or tosylate. A concentration of the compound of formula I in the electrolyte is less than about 10% by volume.

The present disclosure features an alkylating or arylating agent that can be capable of scavenging nucleophilic species that are produced as a byproduct of the normal operation of an EDLC. The nucleophilic species can, for instance, be tertiary amines, carboxylic acids, cellulose type material (e.g., carboxymethyl cellulose (CMC)) used, for example, as a binder or adhesive in the electrode coating, or any other nucleophilic species that can be generated in the cell due to electrochemical, chemical, or thermal side-reactions. These species can be reactive and can interfere with the normal functioning of the EDLC. By scavenging the reactive species, embodiments of the present disclosure can reduce the ability of the nucleophilic species to negatively impact the functioning of the EDLC, and thus result in longer life and improved performance of the cell. For example, in some embodiments, the addition of an alkylating or arylating reagent disclosed herein can result in greater capacitance retention and lower ESR gain.

The term "equivalent series resistance (ESR)" as used herein is understood as a parameter that approximates the internal resistance of an EDLC. In some embodiments, it is more desirable to have lower ESR than higher ESR.

"Capacitance stability" refers to the retention of capacitance of a capacitor over time. In some embodiments, it is desirable to have high capacitance stability.

"Tertiary amine" as used herein is understood to mean an organic compound comprising a nitrogen atom bound to three different carbon atoms.

"Carboxylic acid" is understood to mean a functional group of the formula —C(O)OH. A carboxylate" is understood to mean a deprotonated carboxylic acid of the formula —C(O)O$^-$, wherein it is understood that the negative charge of the carboxylate is balanced by a corresponding counter cation.

"Nucleophilic species" is understood to mean a chemical moiety (e.g., a tertiary amine or a carboxylate) that can act as a nucleophile, for instance in the presence of an alkylating agent. One of skill in the art will understand that a nucleophile is capable of donating an electron pair to an electrophile to form a bond.

The term "substituted" or "substitution" of an atom means that one or more hydrogen on the designated atom is replaced with a different atom, including but not limited to a carbon, nitrogen, oxygen, sulfur or halogen atom, provided that the designated atom's normal valency is not exceeded. "Unsubstituted" atoms bear all of the hydrogen atoms dictated by their valency.

The term "saturated" is understood to mean an aliphatic group containing no double or triple bonds. A saturated group is understood to be at maximum normal valency.

The term "unsaturated" means an aliphatic hydrocarbon group containing a carbon-carbon double bond (e.g., an alkene) or a carbon-carbon triple bond (e.g., an alkyne) and which may be straight or branched having about 2 to about 6 carbon atoms in the chain. In some embodiments, alkenyl groups have 2 to about 4 carbon atoms in the chain. Branched means that one or more lower alkyl groups such as methyl, ethyl, or propyl are attached to a linear alkenyl chain. Exemplary alkenyl groups include ethenyl, propenyl, n-butenyl, and i-butenyl.

The term "alkyl" means an aliphatic hydrocarbon group which may be straight or branched having about 1 to about 6 carbon atoms in the chain. Branched means that one or more lower alkyl groups such as methyl, ethyl or propyl are attached to a linear alkyl chain. Exemplary alkyl groups include methyl, ethyl, n-propyl, i-propyl, n-butyl, t-butyl, n-pentyl, and 3-pentyl.

As used herein, "aryl" refers to aromatic monocyclic or polycyclic ring system containing from 6 to 19 carbon atoms, where the ring system may be optionally substituted. Aryl groups of the present disclosure include, but are not limited to, groups such as phenyl, naphthyl, azulenyl, phenanthrenyl, anthracenyl, fluorenyl, pyrenyl, triphenylenyl, chrysenyl, and naphthacenyl.

As used herein, the abbreviation "Ph-X" is understood to represent an aryl halide. In some embodiments, the aryl halide is phenyl halide. It is understood that "Ph" is an abbreviation for the phenyl group. It is also understood that "X" is an abbreviation for a halogen atom, e.g., iodine, bromine, chlorine or fluorine. Thus, for instance, Ph-Br is understood to represent phenyl bromide.

In some embodiments, the compound of formula I is an alkyl chloride or is an aryl chloride. For example, the compound of formula I can be selected from chlorobenzene, 1-chloro-n-butane, bromobenzene, 1-bromo-n-butane, 1-chloropropane, and 1-bromopropane. In some embodiments, the compound of formula I is chlorobenzene or 1-chloro-n-butane.

In some embodiments, the electrochemical stability of the compounds of formula I can be improved by adding functional groups to the "R" component of formula I. Representative functional groups can be, for example, —CN or —F. For instance, a compound of formula I can be represented by:

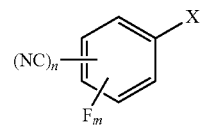

wherein n+m≤5. In some embodiments, Ph-Cl and Ph-F are the most electrochemically stable additives. However, in some embodiments, Ph-F is not as reactive towards nucleophilic species as Ph-I, Ph-Br, and Ph-Cl.

In some embodiments, the compound of formula I is included in the electrolyte, and the electrolyte comprising an ionic species and a solvent. The concentration of the compound of formula I in the electrolyte can be about 0.1% by volume to about 10% by volume. For instance, the concentration of the compound of formula I in the electrolyte can be about 0.1%, 0.2%, 0.3%, 0.4%, 0.5%, 0.6%, 0.7%, 0.8%, 0.1%, 1%, 2%, 3%, 4%, 5%, 6%, 7%, 8%, 9%, or 10%.

In one or more embodiments, the solvent is at least one of acetonitrile, propionitrile, and butyronitrile. Alternatively, the solvent can be selected from gamma-butyrolactone, propylene carbonate, ethylene carbonate, dimethyl carbonate, and diethyl carbonate.

In some embodiments, the ionic species is a quaternary ammonium salt. The quaternary ammonium salt can be one of spiro-bipyrrolidinium tetrafluoroborate (SBP $BF_4$), tetraethyl ammonium tetrafluoroborate (TEA TFB), and triethyl (methyl)ammonium tetrafluoroborate.

In one or more embodiments, the electrolyte further comprises a stabilizer. The stabilizer can be, for instance, benzonitrile.

In some embodiments, the compound of formula I can be included in the separator. The compound of formula I can also be included in at least one of the anode and the cathode, or the compound of formula I can be included in a binder of at least one of the cathode and the anode.

In some embodiments, the binder can include carboxymethyl cellulose.

In one or more embodiments, the EDLC of the disclosure has an operating voltage of greater than about 2.7 V. The EDLC of the disclosure can also have a rated maximum temperature of greater than about 50° C.

In some embodiments, the EDLC can also include a stabilizer. The stabilizer can be benzonitrile. The total concentrations of the stabilizer and the additive can be about the same.

For example, the total concentrations of the stabilizer and the additive can be about 5%, e.g., the concentration of stabilizer can be about 1% and the concentration of additive can be about 4%; the concentration of stabilizer can be about 2% and the concentration of additive can be about 3%; the concentration of stabilizer can be about 2.5% and the concentration of additive can be about 2.5%; the concentration of stabilizer can be about 3% and the concentration of additive can be about 2%; or the concentration of stabilizer can be about 4% and the concentration of additive can be about 1%.

In some embodiments, the compound of formula I can be formulated to alkylate or arylate tertiary amines present within the EDLC cell. In some embodiments, the EDLC cell has an operating voltage of greater than about 2.7 volts and can have an operating temperature of greater than about 50° C.

Without wishing to be bound by any particular theory, it is proposed that the compounds of formula I are capable of alkylating certain reactive species that are produced throughout the course of functioning of an electric double-layer capacitor (EDLC). For example, in some embodiments, EDLCs function at high voltages (e.g., above 2.7 volts) and/or at high temperatures (e.g., above 50° C.). These conditions can facilitate certain chemical reactions to produce certain reactive species (e.g., nucleophilic species) that then can interfere with the normal functioning of the EDLC.

In some embodiments, under the conditions described above, nucleophilic species can be formed such as tertiary amines, carboxylic acids, cellulose-type material such as CMC and other nucleophilic compounds. Without wishing to be bound by theory, the generation of nucleophilic tertiary amines may arise from a Hoffmann Elimination mechanism. For example, it can be practically impossible to remove all trace water from cell components in an EDLC, especially the activated carbon and cellulose separator, even with temperatures above 100° C. and vacuum. The reduction of water within the electrochemical cell (e.g., at high voltage and temperature) can form a hydroxide anion, and the hydroxide anion can then chemically react with a quaternary ammonium cation to form a tertiary amine, via a Hoffman elimination route.

Additionally, nucleophilic species can be formed, for instance, due to electrochemical, chemical or thermal side reactions within the electrochemical cell. For instance, without wishing to be bound by theory, tertiary amines are capable of being formed in an EDLC where the electrolyte contains a quaternary ammonium cation via electrochemical reduction. The electrochemical reduction of a quaternary ammonium cation yields a tertiary amine and an alkyl radical via cleavage of the N—C bond, and also additional tertiary amine can be formed from a fresh cation via a Hoffman elimination mechanism in the case where the alkyl radical is further electrochemically reduced to the carbanion, which serves as the base in the Hoffman elimination. Although the potential of the negative electrode in an EDLC generally operates at levels that are not negative enough to cause gross reduction of the quaternary ammonium cation, in some embodiments, a slow rate of tertiary amine production can exist. For instance, some EDLCs require a constant trickle-current to stay fully charged, and this current can in some embodiments fuel redox reactions in the cell even though the cell theoretically is a redox-free system.

In some embodiments, the higher the operating voltage of the EDLC, the higher the rate of side reactions, and the more likely it will be that tertiary amines are produced in problematic quantities. Also, elevated temperatures improve reaction kinetics which also can accelerate the production of tertiary amines and other degradation products.

In addition to tertiary amines, other nucleophiles such as carboxylic acids or carboxylates can be formed. For instance, a carboxylic acid group can be formed by hydrolysis of an ester group found within the cell. Also, a hydroxide ion, (e.g., produced by the reductive mechanism described above) can hydrolyze an ester group within carboxymethyl cellulose to give a carboxylate group. Yet another source of nucleophilic species within an EDLC is a cellulose-type material such as CMC. CMC can be used as a binder for EDLC electrodes. In some cases either the sodium salt or the ammonium salt of CMC is employed. The CMC can play an important role in ensuring a low resistance contact between the current collector and the coating. It also can help to bind individual carbon particles together within the electrode matrix, and to thicken the slurry used to coat the electrode where a wet coating procedure is used.

The CMC can be water soluble, and in some embodiments is part of an aqueous slurry which is used to either coat the current collector with the active material or with a pre-layer of CMC rich material. For instance, the CMC rich material can contain carbon black, on top of which is later coated the active material. In some preferred embodiments, the solubilized CMC can effectively penetrate interstitial space between particles as well as the coating-current collector interface, and thus bind them effectively once the water is removed by evaporation.

In some embodiments, water soluble cellulose materials can suffer from a decreased chemical stability compared to non-water soluble cellulose types. For example, certain cellulose types can have a very tight crystal structure that does not allow substantial water to penetrate, and therefore these cellulose types are not water soluble and are also less prone to acid catalyzed hydrolysis. Acid catalyzed hydrolysis can result in the depolymerisation of the cellulose chain, and can result in, for example, the slow degradation of paper (cellulose based) used in books and other printed media.

In the case of an EDLC, it is proposed, without wishing to be bound by theory, that the operation of the cell, particularly under harsh conditions (for example 3 V and 65° C.), produces an acidic environment at the positive electrode. In some embodiments, the CMC within this environment can be degraded, and this adversely affects the ESR of the cell. It is known that acidic species can be formed at the positive electrode in an EDLC due to side reactions that take place inside the cell. Additionally, it can sometimes be observed that cells that have undergone accelerated ageing tests have positive electrodes that can be delaminated upon disassembling the cell, suggesting that a reaction took place in the cell that caused the bond between the current collector and the electrode coating to lose most of its strength, and this delamination effect can be replicated in an acid exposure experiment as demonstrated in Example 9. Moreover, such cells suffered from a high gain in ESR during the course of the accelerated ageing test, even though the same cells did not suffer from any significant capacitance loss.

Accordingly, without wishing to be bound by theory, the present disclosure provides a strategy that counters the degradation of CMC in the cell in order to prevent a high ESR gain in the cell under harsh conditions. It is considered that other mechanisms of ESR gain, aside from CMC degradation, are also active.

Without wishing to be bound by theory, these nucleophilic species, as well as the side reactions that produce them themselves, can interfere with the normal functioning of the EDLC cell, and result in higher ESR gain and greater capacitance loss in the cells. In some embodiments, the initial reduction of trace water to hydroxide ion at the negative electrode of an EDLC can cause a loss of performance in the cell.

Moreover, nucleophilic species such as tertiary amines can react at the positive electrode of an EDLC to form insoluble products. Not only can the electrochemical oxidation of the tertiary amine result in a loss of performance within a cell, but the products thus produced can further interfere with the normal cell functioning by way of causing further unknown and/or unwanted side reactions. Without wishing to be bound by theory, the reaction of triethylamineis likely an irreversible electrochemical oxidation at the positive electrode, since tertiary amines are known to undergo such reactions, and are also known to be generally stable at negative potentials.

Accordingly, it is an object of the present disclosure to provide EDLCs containing compounds of formula I that can be useful at alkylating or arylating reactive species (e.g., tertiary amines or carboxylic acids) in order to scavenge these species and thus prevent them from interfering with the normal operation of the cell.

In some embodiments, the alkylating (e.g., alkyl halides such as chlorobutane) or arylating agents (e.g., aryl halides such as phenyl chloride) can react with nucleophilic species. For instance, chlorobutane can react with a tertiary amine such as triethylamine in an alkylation reaction to generate butyltriethylammonium chloride. Alternatively, in some embodiments, a compound of formula I (e.g., chlorobutane) can react with the hydroxide ion (e.g., a hydroxide ion generated by the presence of trace water) to give an alcohol (e.g., butanol) and the corresponding halide (e.g., chloride).

Furthermore, the alkylating or arylating agents of the present disclosure can be capable of alkylating, for example, the carboxy group of a cellulose binder and thus can affect the stability of the cellulose material. Without wishing to be bound by theory, an increase in stability of the cellulose material (e.g., CMC) can occur due to an increase in the hydrophobicity of the cellulose due to the alkylation (esterification, in the case of the alkylation of a carboxy/carboxyl/carboxylate group) of the material. Such an alkylation can also affect the crystal structure, and/or the electronic structure, of the cellulose material, which can serve to further improve stability. Alkylation of the hydroxyl groups of the cellulose binder (e.g., CMC) can also occur. Without wishing to be bound by theory, the alkylation can take place through known organic chemical mechanisms. The alkylation process can also be applied to other types of cellulose, as well as other polymers, biopolymers, polysaccharides and carbohydrates, in addition to CMC. Such other polymers can include, but are not limited to, alcohol and carboxy functionalized polymers, for example polyvinylalcohol, sodium polyacrylate, ammonium polyacrylate.

Additionally, in some instances the carboxyl functional group (COO—) that is present in cellulose (e.g., CMC) can undergo electrochemical oxidation, yielding carbon dioxide gas ($CO_2$), leaving a radical site on the polymer chain. Any $CO_2$ released by such a reaction can be trapped in the cell and can undergo electrochemical (or chemical) reactions, in some embodiments at the negative electrode. Such reactions can cause a performance loss for the cell. Accordingly, in some embodiments alkylation of the carboxyl group to form an ester can result in an increase in the electrochemical stability of the cellulose. Such an alkylation can be achieved by the use of an alkylating agent of the present disclosure, such as an alkyl halide or an aryl halide. The alkylating agent can also react with (e.g., esterify) carboxyl moieties within the electrolyte (for example carboxylic acids) or on the carbon surface (which contains, for instance, functional groups), and such reactions can in some embodiments increase the electrochemical stability of the system.

Additionally, the alkyl or aryl halides of the present disclosure can alkylate or arylate the carbon surface where reactive functional groups (e.g., carboxylic acid groups) are present. Such alkylation can also enhance cell stability.

Although both alkyl and aryl halides can be used, differences in carbon-halogen bond strengths as well as affinities to a carbon surface can result in differences in EDLC cell performance between the alkyl and aryl systems.

In some embodiments, the product of the reaction of the compound of formula I with a tertiary amine is a quaternary ammonium salt and a corresponding counter anion derived from the compound of formula I (e.g., a chloride ion). In some embodiments the quaternary ammonium product is relatively stable at positive potentials compared to the tertiary amine, and thus the stability of the cell is improved by eliminating the unstable tertiary amine or other nucleophilic species that would otherwise undergo further reaction.

Additionally, in some embodiments, adsorption of the aryl or alkyl halide to the carbon surface, e.g., as a monolayer, can reduce side reactions by reducing access of acetonitrile or other electrolyte species to the carbon surface, thereby reducing the reaction rate of acetonitrile of other electrolyte species and extending cell life.

As defined above, ESR refers to a parameter that approximates the internal resistance of an EDLC. As shown in the Examples below, the addition of a tertiary amine (e.g., as a representative nucleophile) causes the ESR gain to increase, thereby reducing the performance of the cell. Although most EDLCs do not have added tertiary amine, it is understood that tertiary amines and other nucleophilic species can be formed within a cell as described above, and these can have a deleterious effect on the performance of the cell.

Figure 5:
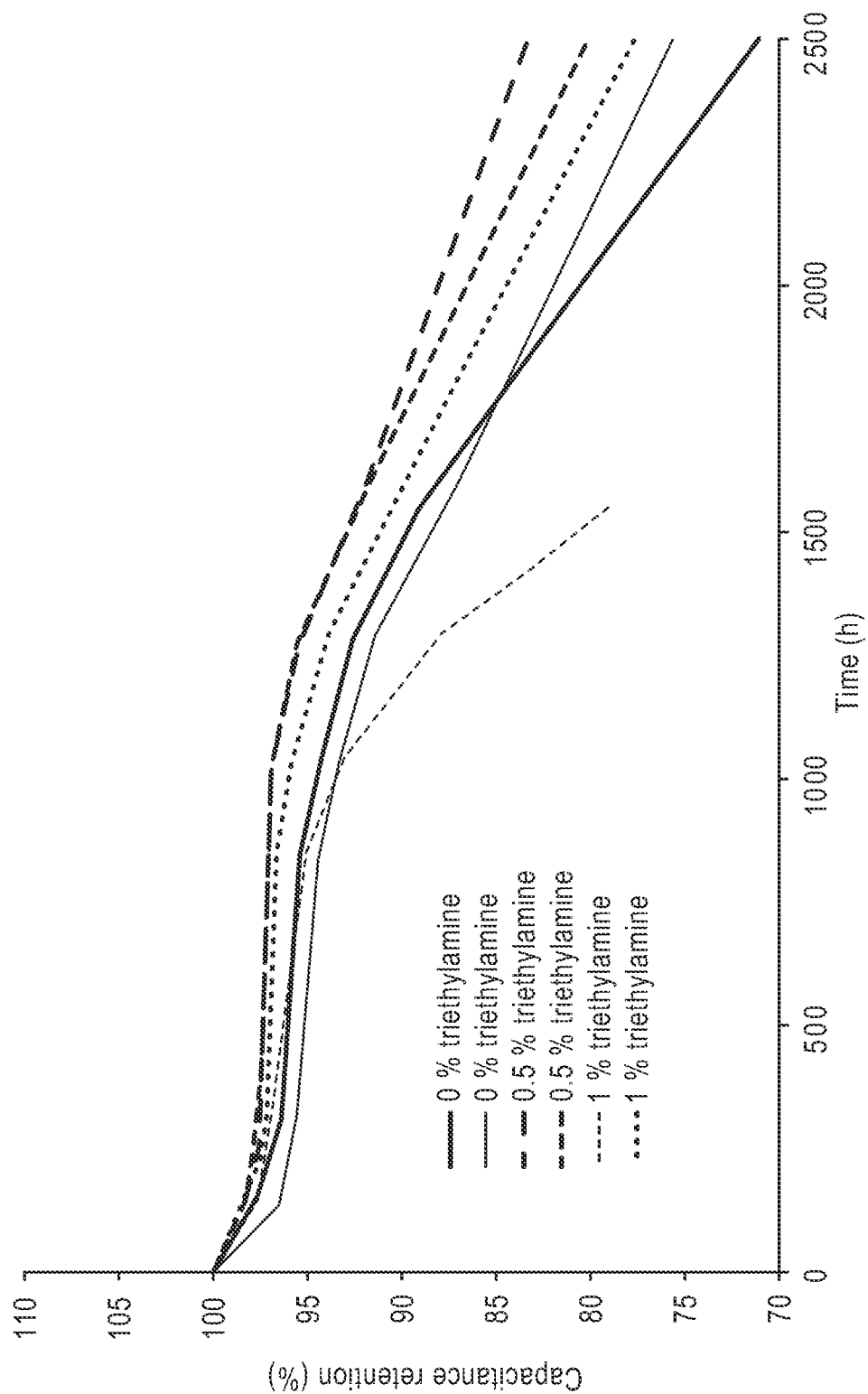
FIG. 5 shows the capacitance retention for 4.4F pouch cells with 0%, 0.5%, and 1% (v:v) triethylamine added to the electrolyte.
Figure 6:
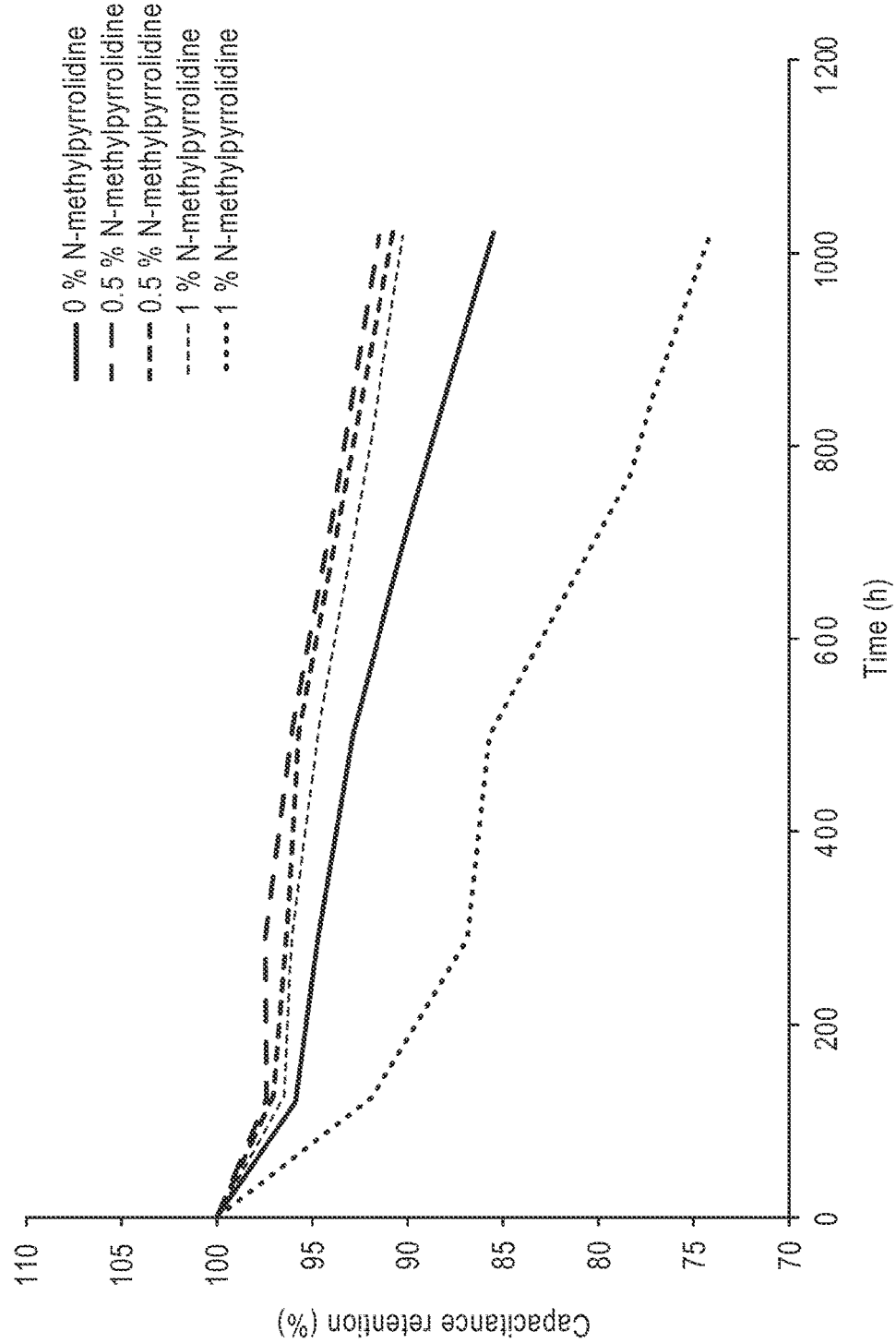
FIG. 6 shows the capacitance retention for 4.4F pouch cells with 0%, 0.5%, and 1% (v:v) N-methylpyrrolidine added to the electrolyte.

As defined above, capacitance stability refers to the retention of capacitance of a capacitor over time. In some embodiments, addition of a tertiary amine to an EDLC can improve capacitance stability, as shown in FIG. 5 and FIG. 6. In these examples, addition of triethylamine and N-methylpyrrolidine resulted in greater capacitance stability.

EXAMPLES

The following examples are for illustrative purposes only and are not intended to limit the scope of the present disclosure.

General Methods

Pouch cells consisted of an activated carbon based positive electrode and an activated carbon based negative electrode, each utilizing an etched aluminum current collector. A cellulose separator was used to separate the electrodes, and the electrode assembly was contained in an aluminum-polymer type pouch cell material. Each electrode had a coated area of 16 cm² (i.e. 4 cm×4 cm in size). Each cell contained a total of 1 mL of electrolyte.

Example 1

Effect of Added Triethylamine on EDLC Cell Performance

Pouch cells (~4.4F) were prepared with added triethylamine (1% v:v) and N-methylpyrrolidine (1% v:v) and in the absence of added tertiary amine (control). The cells were charged at a constant current of 50 mA.

Figure 1:
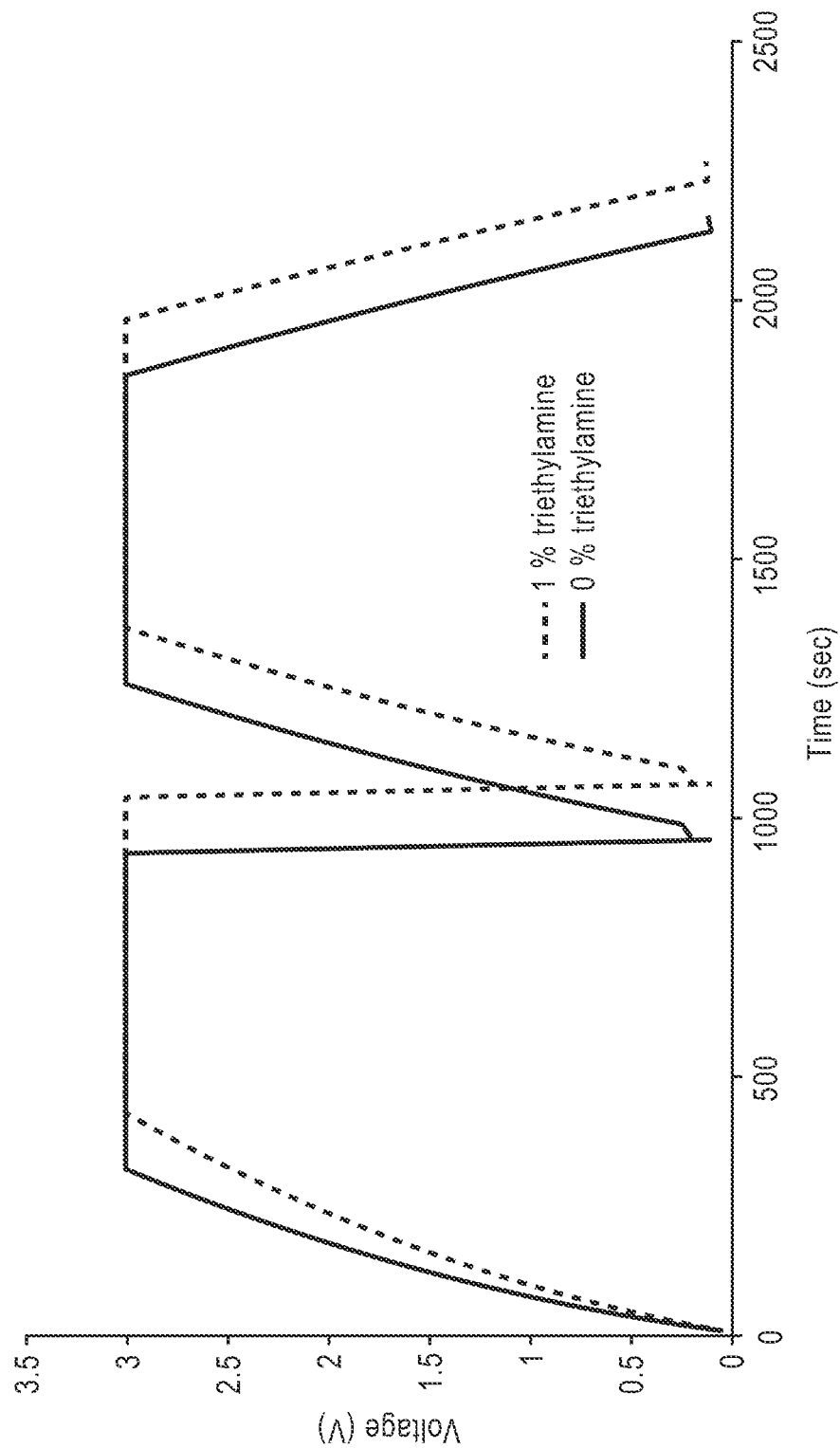
FIG. 1 shows charge and discharge curves for 4.4F pouch cells with 0% and 1% (v:v) triethylamine added to the electrolyte.
Figure 2:
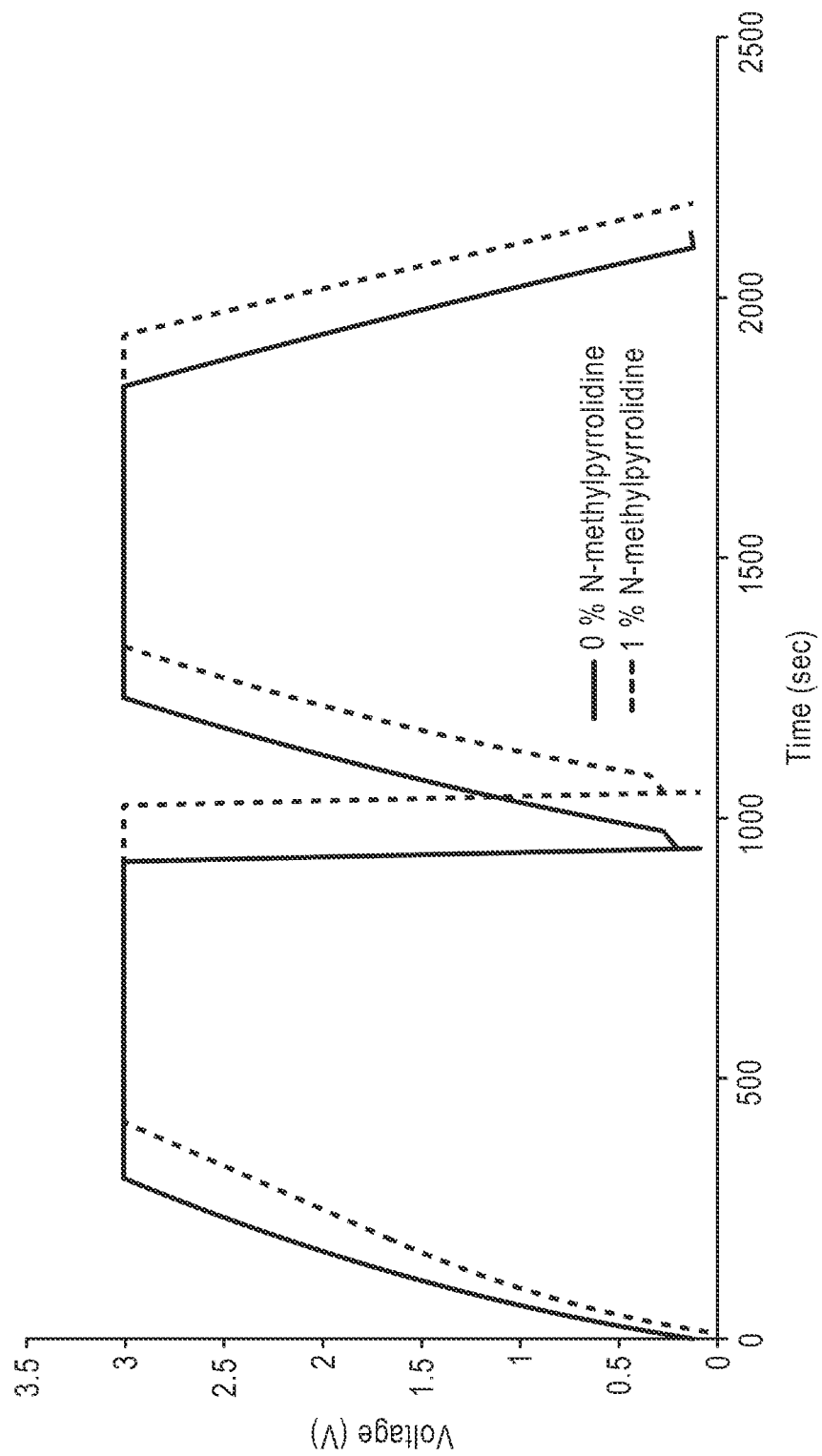
FIG. 2 shows charge and discharge curves for 4.4F pouch cells with 0% and 1% (v:v) N-methylpyrrolidine added to the electrolyte.

FIG. 1 shows a voltage curve of a pouch cell containing triethylamine (1% v:v) (dashed line) compared with a pouch cell containing no added triethylamine (solid line). The cell with added triethylamine shows a charge curve of lower steepness than the cell with 0% triethylamine. FIG. 2 shows a voltage curve of a pouch cell containing N-methylpyrrolidine (1% v:v) (dashed line) compared with a pouch cell containing no added triethylamine (solid line). The cell with added triethylamine showed a charge curve of lower steepness than the cell with 0% triethylamine.

FIGS. 1 and 2 show a charge curve of lower steepness for a cell containing amine (1% v:v) (i.e., triethylamine or N-methylpyrrolidine) added to the electrolyte compared to a cell without added amine. The results suggest that the amine is being consumed electrochemically during the charging of the cell.

Example 2

Effect of Added Triethylamine on ESR Gain

Pouch cells (~4.4F) were prepared with added triethylamine (1% v:v) and N-methylpyrrolidine (1% v:v) and in the absence of added tertiary amine (control). The cells were charged at a constant current of 50 mA.

Figure 3:
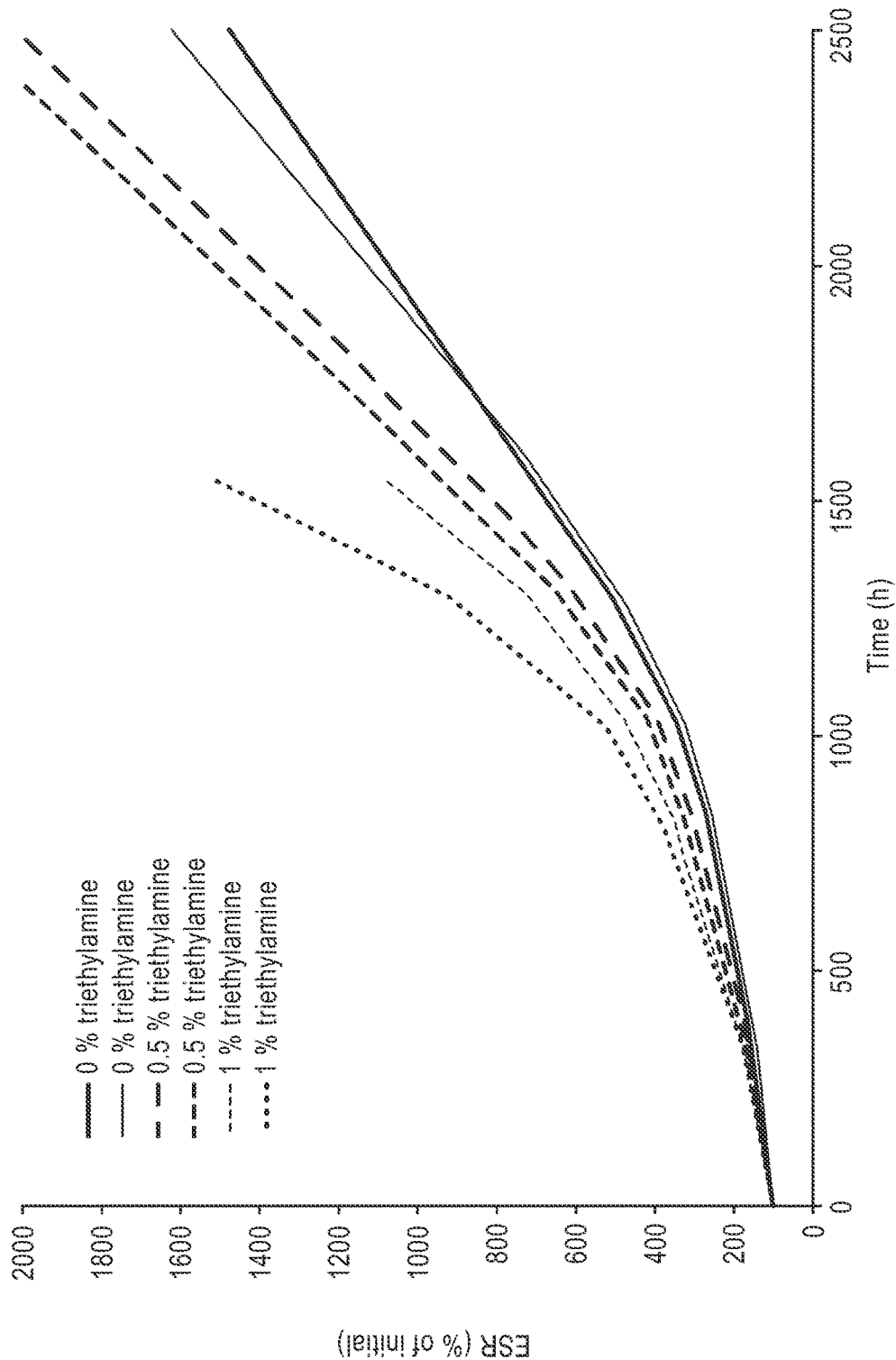
FIG. 3 shows the ESR gain for 4.4F pouch cells with 0%, 0.5%, and 1% (v:v) triethylamine added to the electrolyte.

As shown in FIG. 3, addition of triethylamine ($Et_3N$) to an EDLC had a deleterious effect on ESR gain during the endurance test when used (0.5% v:v) or more in the electrolyte. In some embodiments, the effects became more exaggerated at extended time periods.

Figure 4:
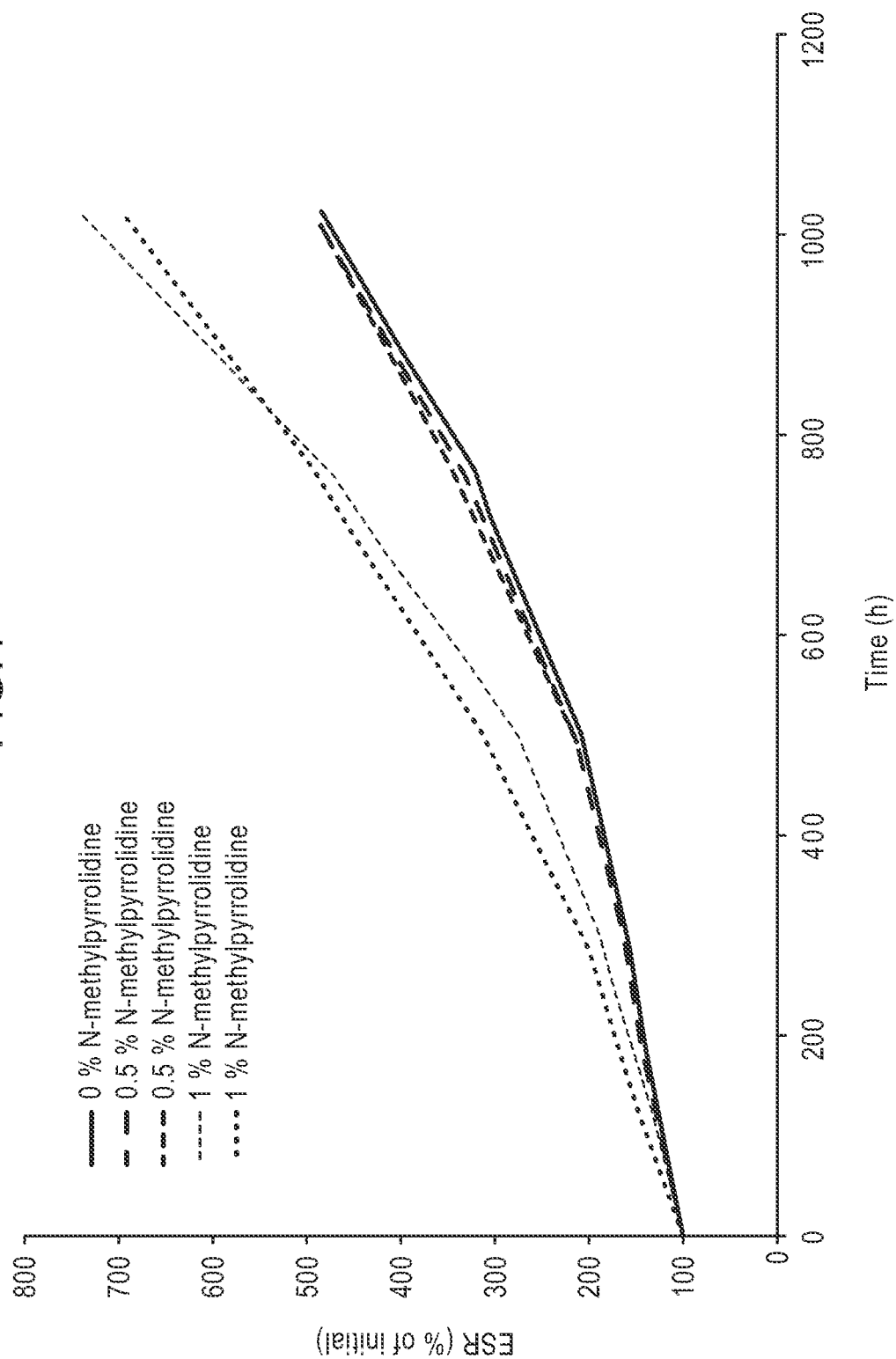
FIG. 4 shows the ESR gain for 4.4F pouch cells with 0%, 0.5%, and 1% (v:v) N-methylpyrrolidine added to the electrolyte.

As shown in FIG. 4, addition of N-methylpyrrolidine to an EDLC had a deleterious effect on ESR gain during the endurance test when used (0.5% v:v) or more in the electrolyte. In some embodiments, the effects became more exaggerated at extended time periods.

At levels below 0.5% (v:v) triethylamine and 0.5% (v:v) N-methylpyrrolidine (not shown in) there did not appear to be an obvious major penalty.

Example 3

Effect of Added Triethylamine on Capacitance Stability

Pouch cells (~4.4F) were prepared with added triethylamine (1% v:v) and N-methylpyrrolidine (1% v:v) and in the absence of added tertiary amine (control). The cells were charged at a constant current of 50 mA. As shown in FIG. 5, the addition of triethylamine to the electrolyte resulted in an improved capacitance retention. The same results were observed with the addition of N-methylpyrrolidine (see FIG. 6).

Example 4

Effect of Aryl Halides on Electrochemical Stability in Unconditioned Cells

Unconditioned pouch cells were treated with Ph-I (1% v:v), Ph-Br (1% v:v), Ph-Cl (1% v:v), and Ph-F (1% v:v). An unconditioned pouch cell without added aryl halide was used as a control. The cells were charged at 50 mA, held for 10 minutes at 3.0 V, discharged at 5 A, rested for 5 seconds, charged at 50 mA, held at 3 V for 10 minutes, and finally discharged at 50 mA.

Figure 7:
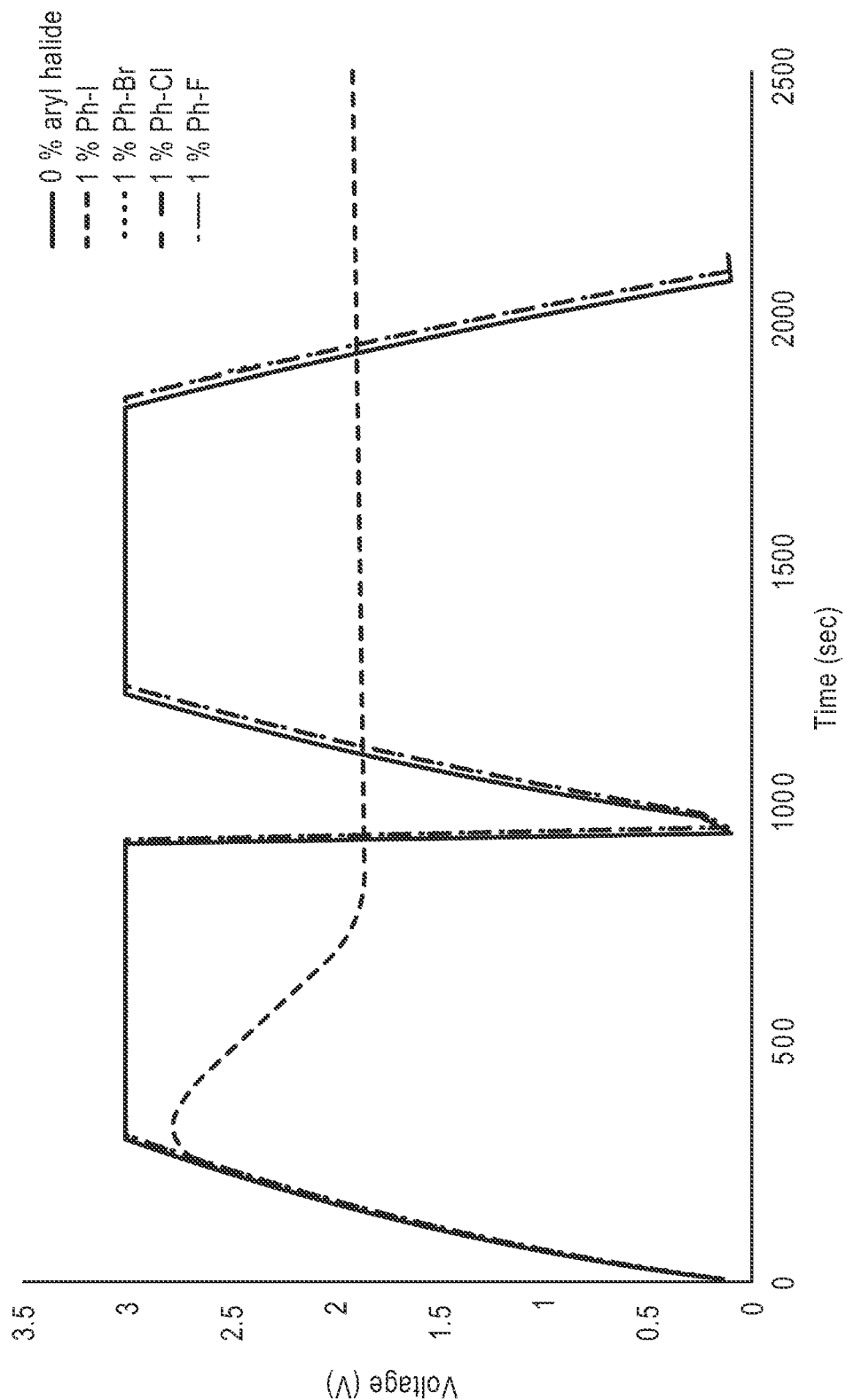
FIG. 7 shows voltage vs. time profiles for unconditioned pouch cells with 0% aryl halide, 1% Ph-I, 1% Ph-Br, 1% Ph-Cl, and 1% Ph-F (v:v).

FIG. 7 shows voltage vs. time profiles for the pouch cells after the two charge-discharge cycles described above. As shown in FIG. 7, the cell containing Ph-I was unable to reach the full 3 V charge. The results suggest that Ph-I was not electrochemically stable and was being directly reduced at the negative electrode under the conditions of the 3 V pouch cell.

In contrast, Ph-Br and Ph-Cl did not display any noticeable electrochemical reactivity within the 3 V cell. Without wishing to be bound by any theory, it is proposed that the Ph-I is being reacted electrochemically within the cell. The resulting $I^-$ (iodide) ion can then serve as a redox shuttle involving $I^-$, $I_2$ and $I_3^-$, and thus interrupting the normal functioning of the cell.

Example 5

Effect of Aryl Halides on Electrochemical Stability in Conditioned Cells

Pouch cells treated with Ph-Br (1% v:v), Ph-Cl (1% v:v), and Ph-F (1% v:v) were conditioned at 3 V and 65° C. for 18 hours. A conditioned pouch cell without added aryl halide was used as a control. The cells were charged at 50 mA, held for 10 minutes at 3.0 V, discharged at 5 A, rested for 5 seconds, charged at 50 mA, held at 3 V for 10 minutes, and finally discharged at 50 mA.

Figure 8:
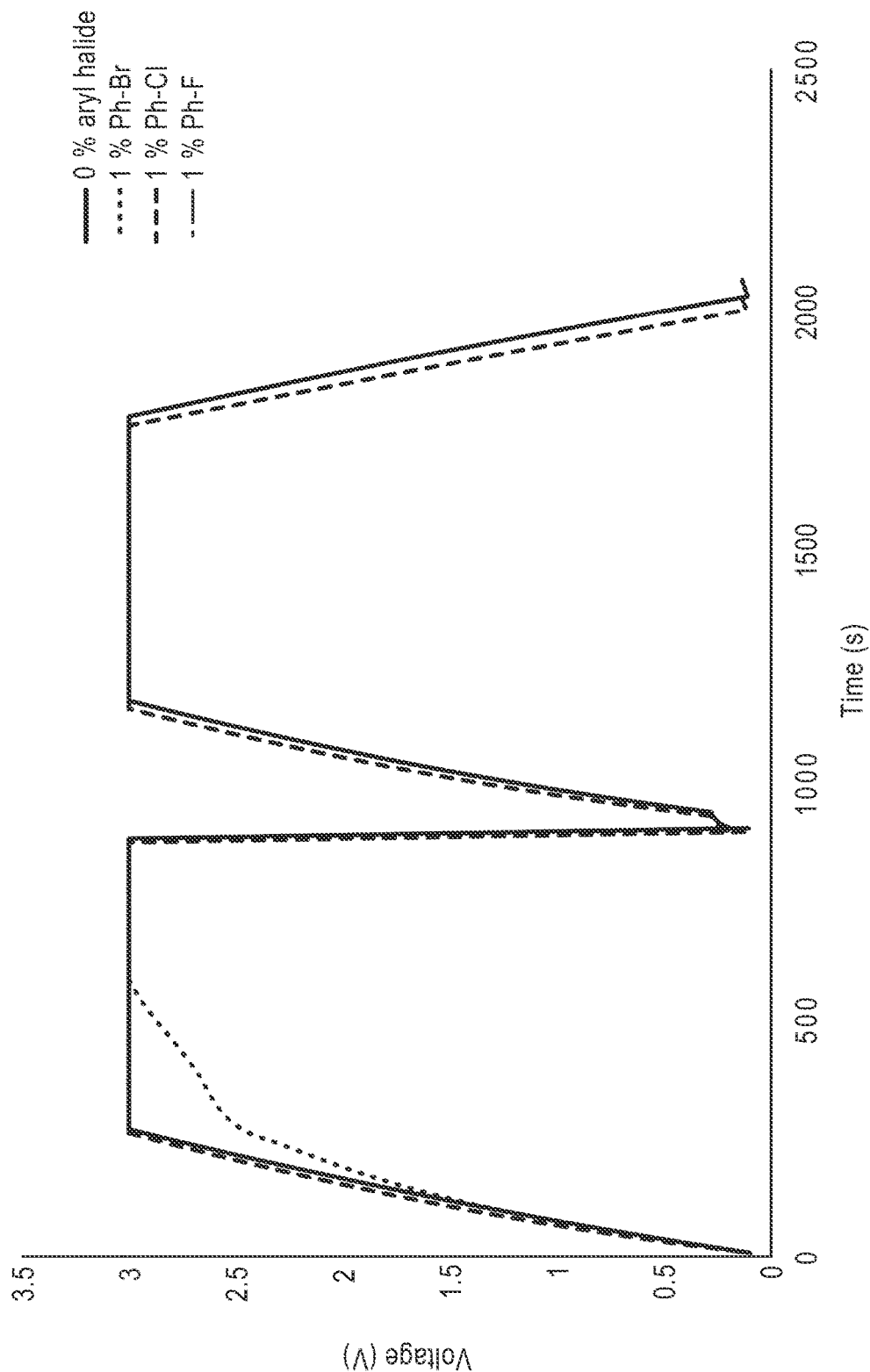
FIG. 8 shows voltage vs. time profiles for pre-conditioned pouch cells with 0% aryl halide, 1% Ph-I, 1% Ph-Br, 1% Ph-Cl, and 1% Ph-F (v:v).

FIG. 8 shows voltage vs. time profiles for the pouch cells after the two charge-discharge cycles described above. As shown in FIG. 8, cells containing Ph-Br developed an instability which retarded the charging process. The results suggest that Ph-Br was not electrochemically stable and was being reduced at the negative electrode of the conditioned pouch cell. Without wishing to be bound by any theory, a bromide redox process is potentially active within the electrochemical cell, but it was delayed in being established. The Ph-Cl, Ph-F and control cells did not experience any difficulties. Therefore, without wishing to be bound by theory, it is proposed that the Ph-Cl and Ph-F cells were considered to have adequate electrochemical stability. However, also without wishing to be bound by any theory, the Ph-F is not expected to have a high reactivity towards tertiary amines or many other nucleophiles, due to the high stability of the Ph-F bond.

Example 6

Effect of Using Chlorobenzene (pH-Cl) on Electrochemical Cells

Pouch cells were made to test the effect of using an electrolyte that included phenyl chloride (Ph-Cl) (1% v:v). As a control, an electrolyte with 0% (v:v) of phenyl chloride was used.

For the control cell, the electrolyte consisted of 1 M SBP $BF_4$ in acetonitrile+5% (v:v) benzonitrile. For the cell with Ph-Cl as additive, the electrolyte consisted of of 1 M SBP $BF_4$+5% benzonitrile+1% Ph-Cl (v:v). For instance, the electrolyte with the Ph-Cl present could be made by taking 1.0 L of 1 M SBP $BF_4$ in acetonitrile, adding 50 mL of benzonitrile, and adding 10 mL of Ph-Cl.

Cells were conditioned by holding them at 3.0 V and 65° C. for 18 h prior to beginning the endurance test, which in essence is a constant voltage, elevated temperature test designed to gauge the electrochemical stability of the system. The capacitance and ESR of the device are measured at room temperature before the endurance test begins, as well as at certain time intervals throughout the test. For measurements made during the test the cells are discharged and allowed to cool to room temperature before the capacitance and ESR are measured. Once the measurements are made the cells are returned to the accelerated degradation condition (3.0 V and 65° C.).

Figure 9:
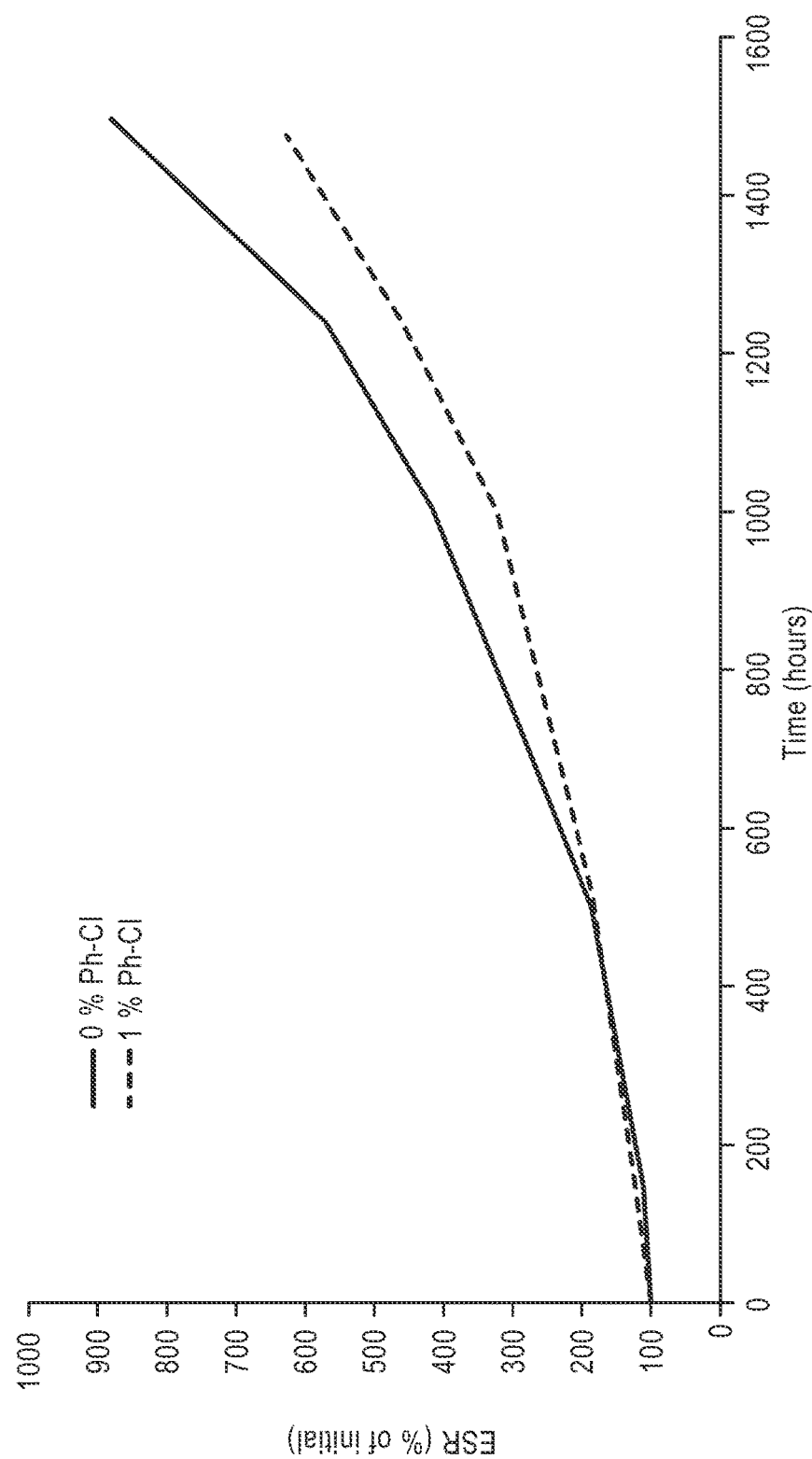
FIG. 9 shows the ESR gain of pouch cells with added Ph-Cl at 0% and 1% (v:v).
Figure 10:
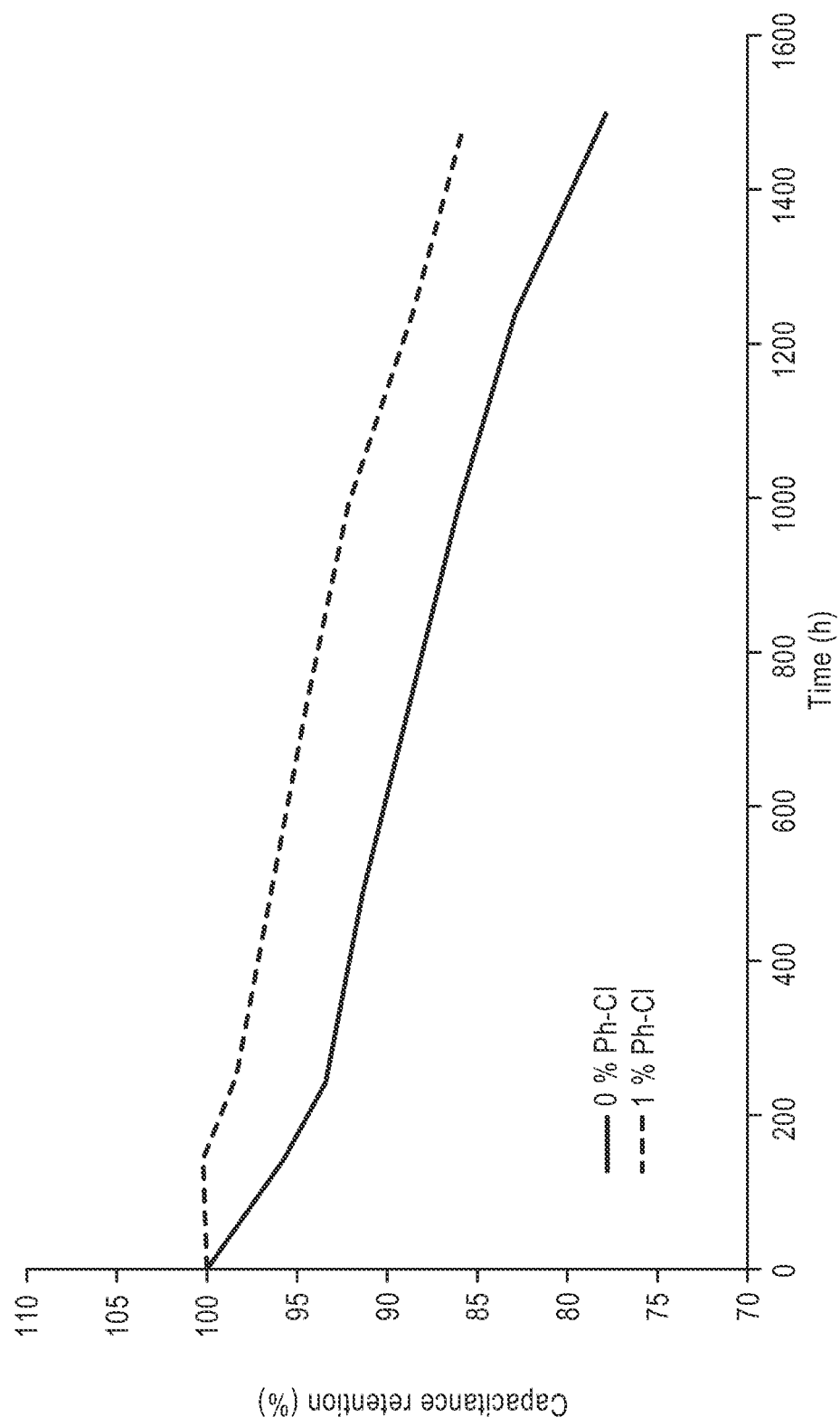
FIG. 10 shows the capacitance retention of a pouch cell treated with 0% and 1% Ph-Cl (v:v).
Figure 11:
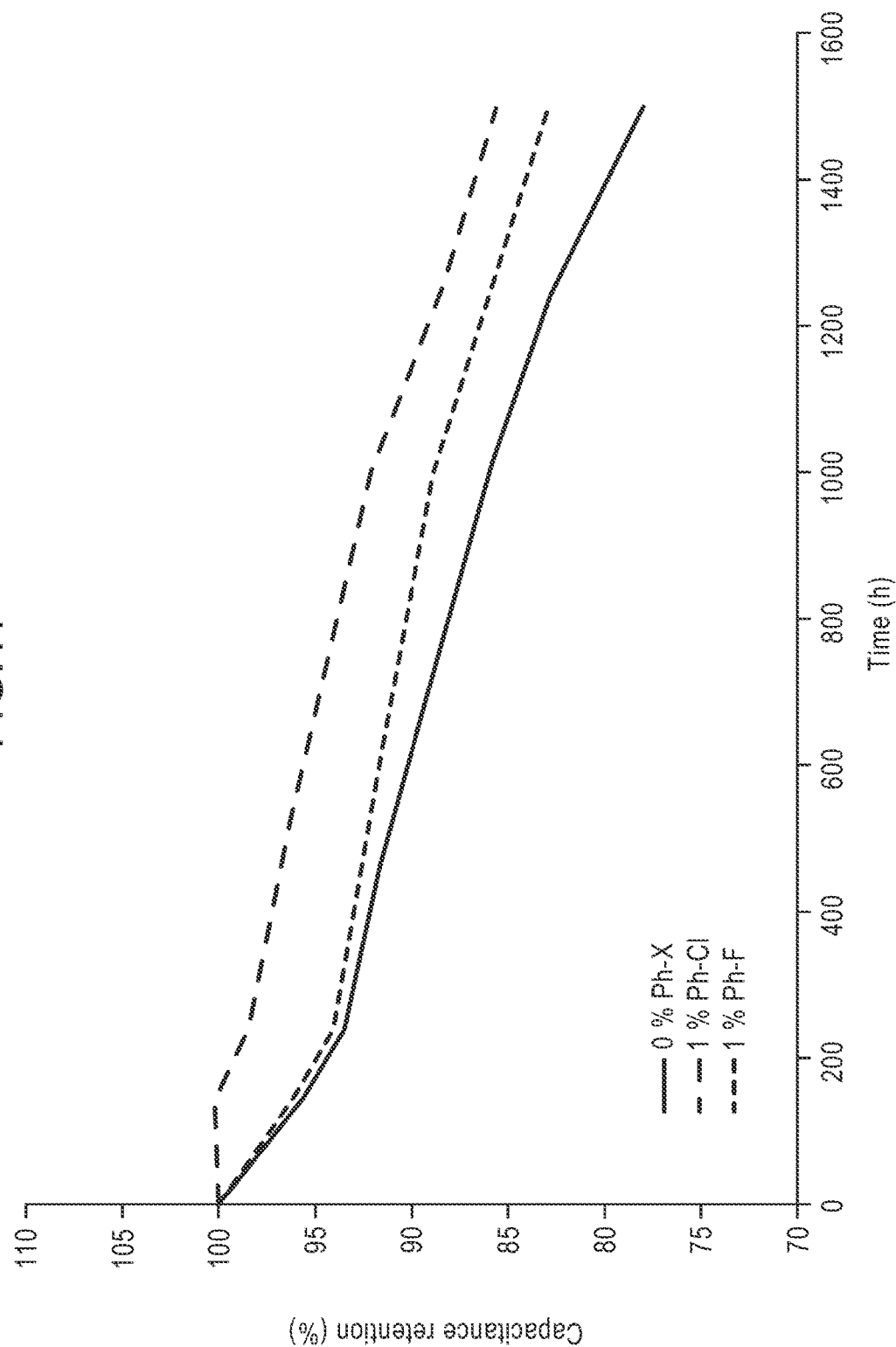
FIG. 11 shows the capacitance retention of pouch cells treated with 0% aryl halide, 1% Ph-Cl and 1% Ph-F (v:v).

FIG. 9 shows that the cell with Ph-Cl (1% v:v) present as an additive experience less ESR gain during the endurance test. FIG. 10 shows that the cell with the Ph-Cl present as an additive have equal or better capacitance retention than cell that does not have this additive. The sudden capacitance drop observed in the control cell during the first 100 h of the test is avoided by using the Ph-Cl additive. FIG. 11 shows that Ph-F does not cause this unusual affect to manifest. Without wishing to be bound by any theory, this difference may be due to the chemical reactivity of Ph-Cl, (Ph-F is not as chemically active as Ph-Cl due to the high stability of the C—F bond) or perhaps due to the more polarizable nature of the C—Cl bond—which could plausibly affect capacitance if Ph-Cl is adsorbed to the carbon surface.

Inspection of cells after the endurance test did not show any noticeable corrosion of the aluminum current collectors. Without wishing to be bound by any theory, the presence of chlorine, especially as Cl— (chloride), could arguably promote corrosion of the current collector on the positive electrode.

Example 7

Effect of Using 1-Chloro-n-Butane on Electrochemical Cells

Pouch cells similar to those in Example 6 were made to test the effect of using an electrolyte that included butyl chloride (Bu-Cl) (1% v:v), also known as 1-chloro-n-butane. As a control, cells were also made using 0% of butyl chloride.

For the control cells, the electrolyte consisted of 1 M SBP $BF_4$ in acetonitrile+5% benzonitrile. For the cells with Bu-Cl as additive, the electrolyte consisted of 1 M SBP BF4+5% benzonitrile+1% Bu-Cl (v:v). For instance, the electrolyte with the Bu-Cl present could be made by taking 1.0 L of 1 M SBP BF4 in acetonitrile, adding 50 mL of benzonitrile, and adding 10 mL of Bu-Cl.

Cells were conditioned, and subjected to the endurance test at 3.0 V and 65° C. as in Example 6.

Figure 12:
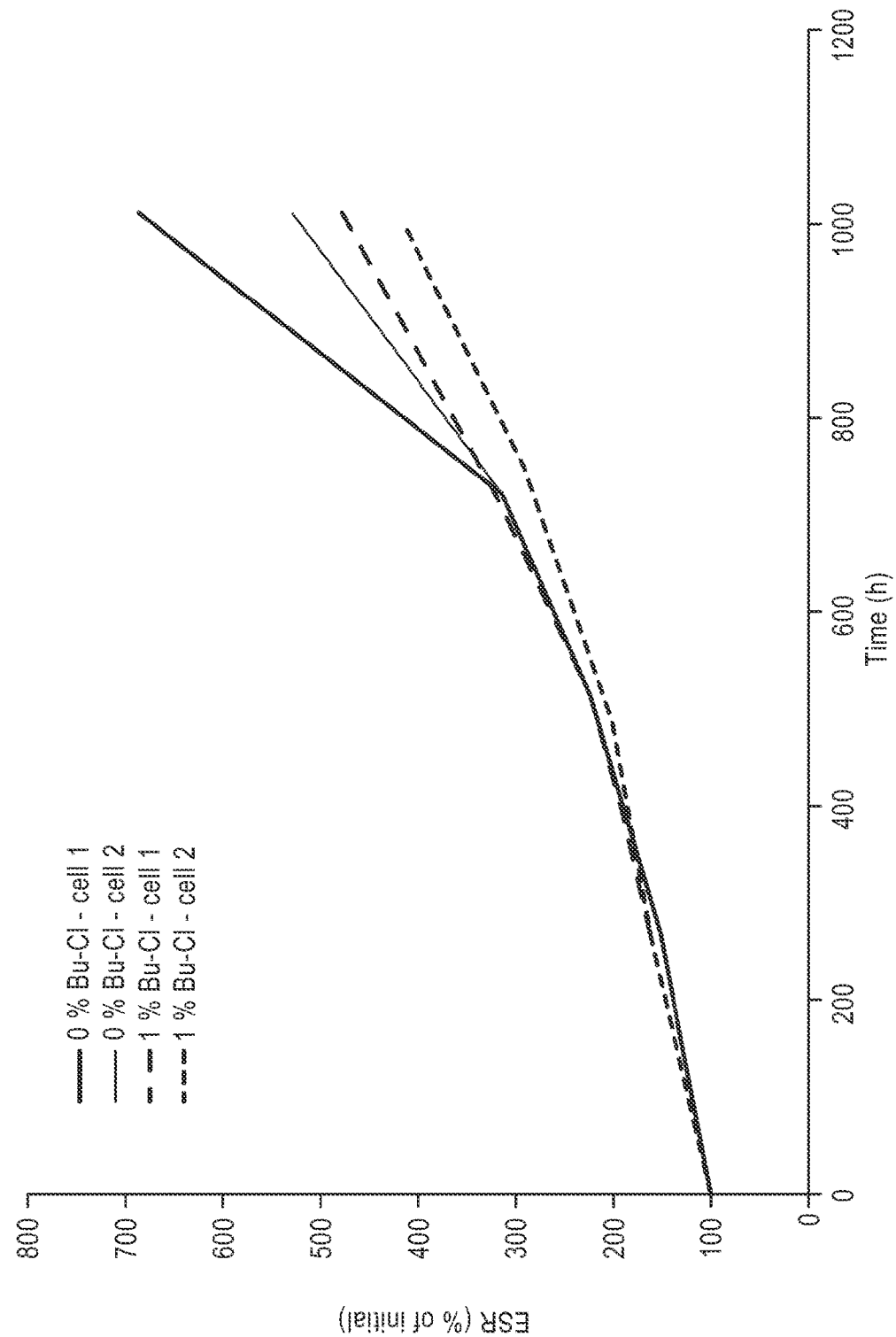
FIG. 12 shows the ESR gain of pouch cells treated with 0% Bu-Cl and 1% Bu-Cl (v:v).
Figure 13:
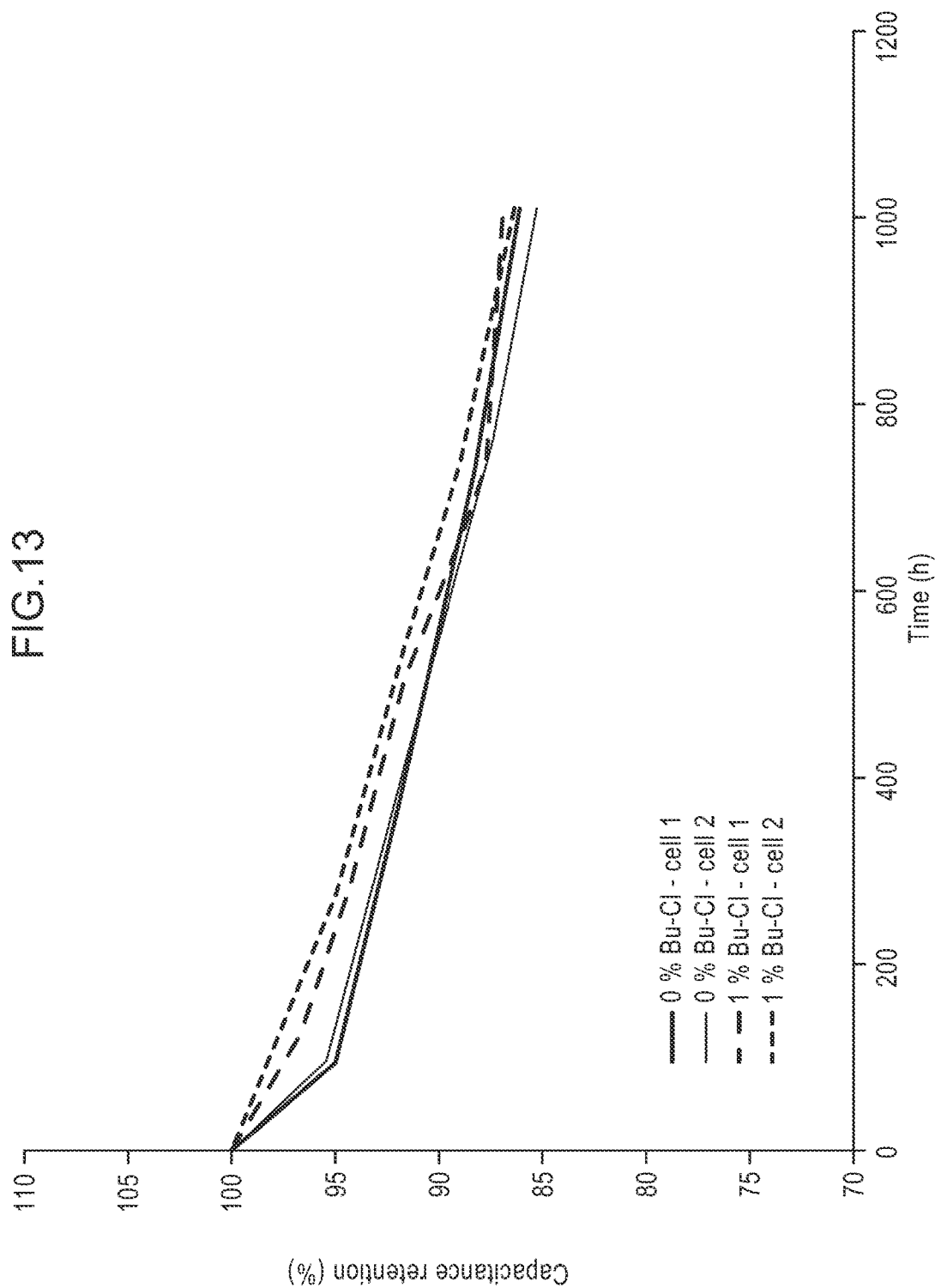
FIG. 13 shows the capacitance retention of pouch cells treated with 0% Bu-Cl and 1% Bu-Cl (v:v).

FIG. 12 shows that the presence of Bu-Cl results in a reduced ESR gain for the cells operating at 3.0 V and 65° C., with the effect being most obvious after about the 500 h point. FIG. 13 shows that the capacitance is the same or better than the cells without Bu-Cl, with the cells being slightly but noticeably better during most of the 1000 h period. As for Ph-Cl, there presence of Bu-Cl significantly affects the capacitance within the first 100 h of the test period observed in the control cell, preventing much of the sudden drop in capacitance.

Example 8

Effect of Stabilizer on Performance of Electrochemical Cells

Commercial style, spirally wound cylindrical cells with activated carbon based electrodes were made, being of approximately 1300 F capacitance and 0.45 mOhm ESR each, to test the effect of using an electrolyte based on 1 M SBP $BF_4$ in acetonitrile containing 2% Ph-Cl in addition to 3% benzonitrile (v:v) as a stabilizer (BZN) (dual additive system). As a control, cells containing 5% benzonitrile (v:v) were also tested (single additive system). As indicated, the percentages for the additives are on an added volumetric basis. For instance, the dual additive electrolyte can be made by taking 1 L of 1 M SBP BF4 in acetonitrile and adding 20 mL of Ph-Cl and 30 mL of BZN. Cells were conditioned before starting the test by holding them at 2.92 V at 55° C. for 44 h. The cells were subjected to the endurance test at 3.0 V and 65° C., as described in example 4, for 1024 h.

ESR Gain

Figure 14:
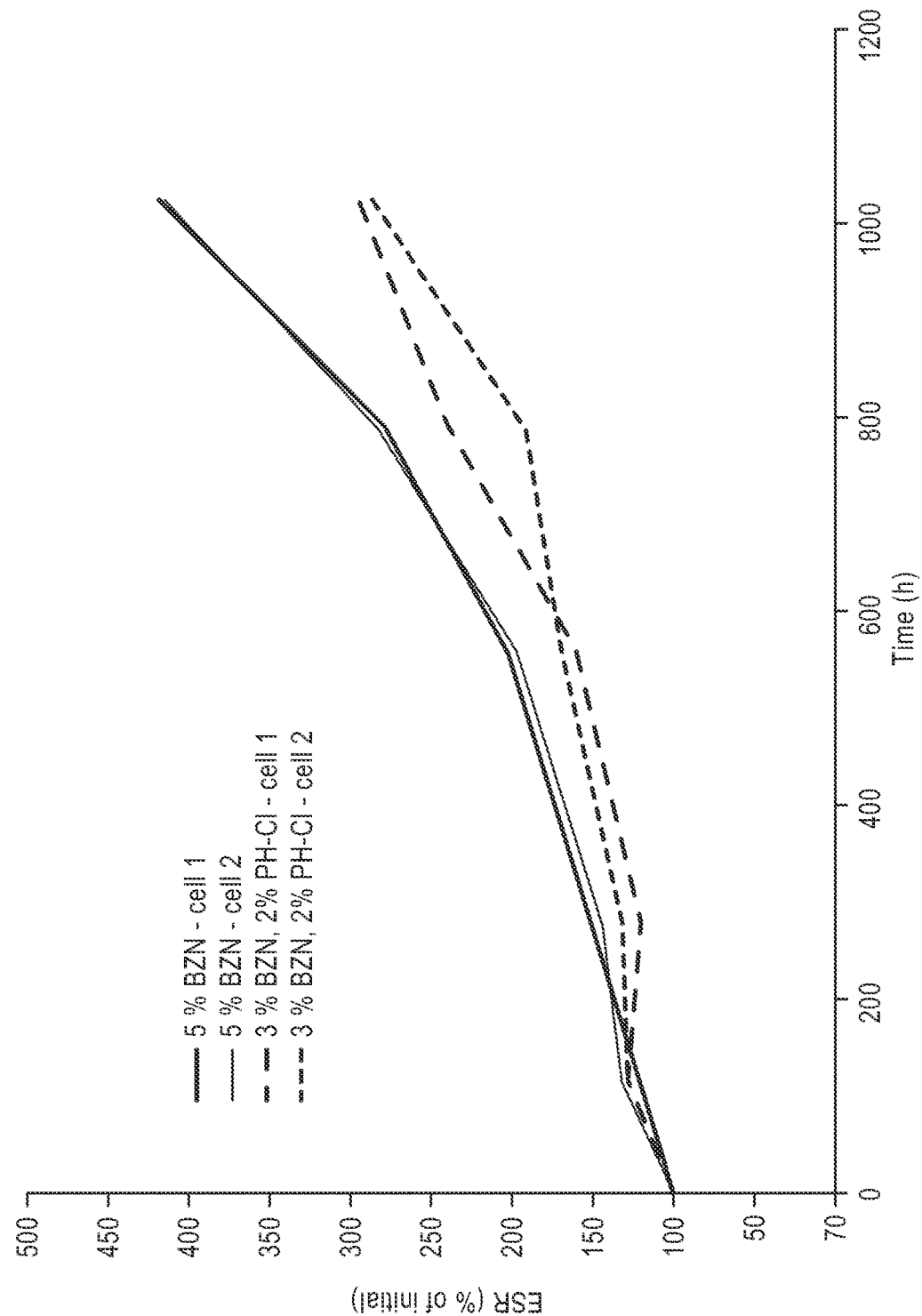
FIG. 14 shows the ESR gain of cylindrical cells treated with 5% benzonitrile (v:v) and with a 3% benzonitrile/2% Ph-Cl (v:v) mixture.

The ESR behavior of the cells is shown if FIG. 14, the dual additive system exhibits significantly lower ESR gain, about 290% of the initial ESR after the 1024 h period, compared with about 415% for the single additive system. Without wishing to be bound by any theory, the ESR gain can result primarily from a corruption of the carbon coating—current collector interface, and changes to the binder system can significantly reduce the ESR gain even further. The results of this direct comparison suggest that the Ph-Cl additive is advantageous for ESR stability under this standard test condition.

Capacitance Loss: 80-40% of Rated Voltage

Figure 15:
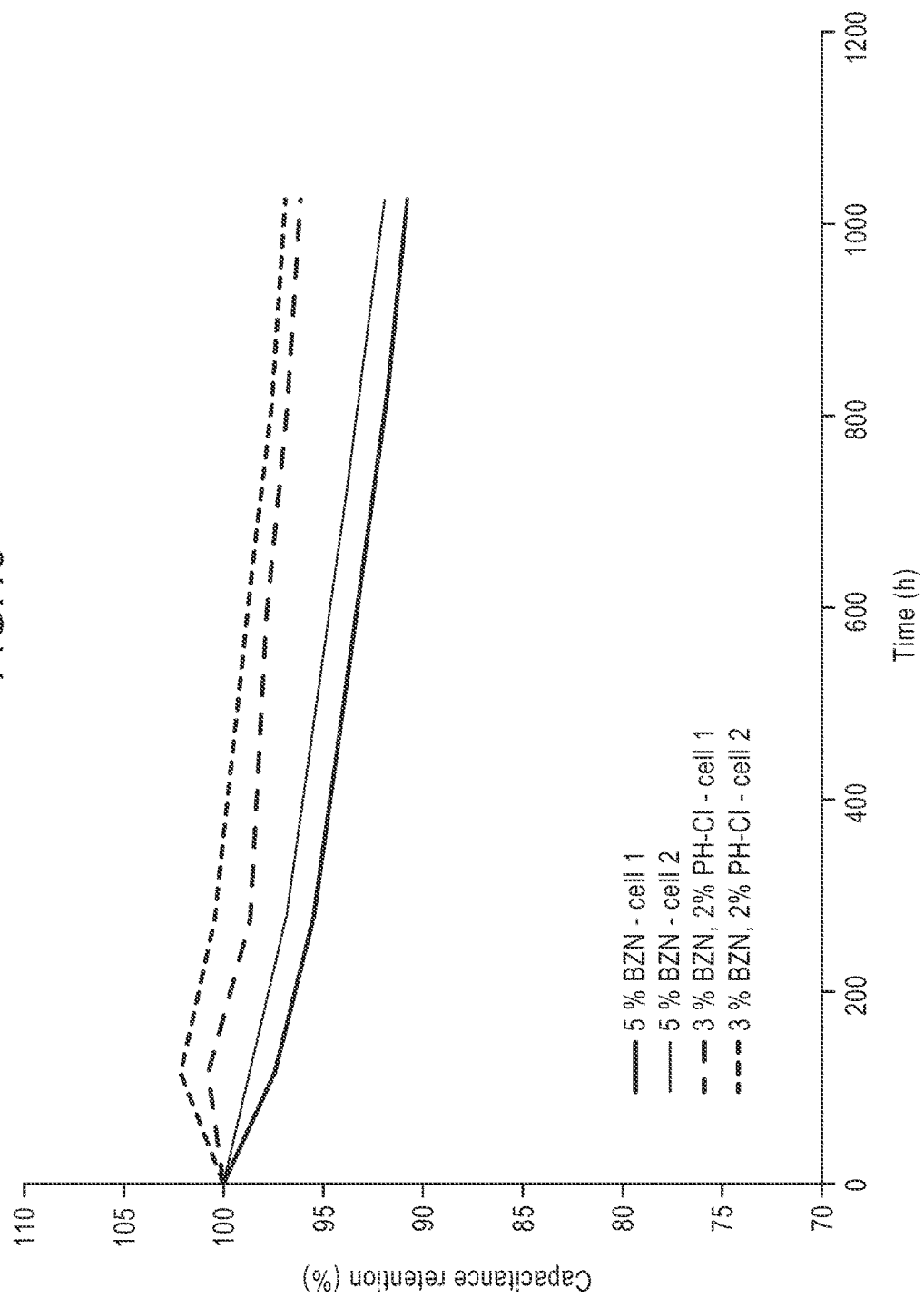
FIG. 15. Shows the capacitance retention of cylindrical cells treated with 5% benzonitrile (v:v) and with a 3% benzonitrile/2% Ph-Cl (v:v) mixture incells measured between 80 and 40% of rated voltage.

FIG. 15 shows that the cells containing 2% Ph-Cl and 3% BZN (v:v) exhibit significantly less capacitance loss compared to cells with 5% BZN (v:v), where capacitance is measured between 80 and 40% of rated voltage, i.e. between 2.4 and 1.2 V. The dual additive cells experience a slight capacitance gain over the first approximately 100 h of the endurance test, in contrast to a capacitance loss for the single additive system. The cells with the dual additive system have between 96 and 97% of their original capacitance after the 1024 h period, which is an exceptional level of stability, compared to about 91 to 92% for the single additive system.

Capacitance Loss: Full Voltage

Figure 16:
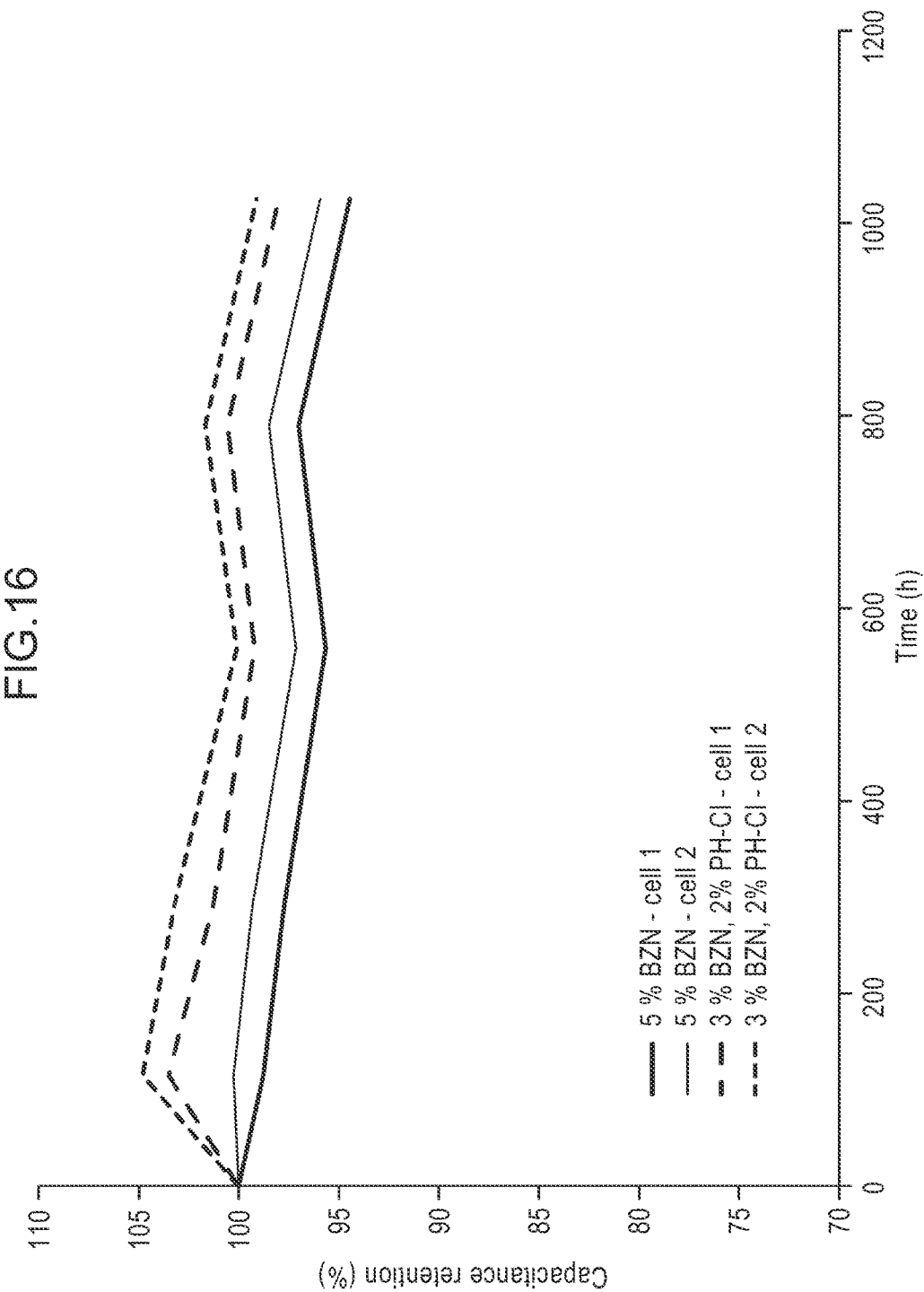
FIG. 16. Shows the capacitance retention of cylindrical cells treated with 5% benzonitrile (v:v) and with a 3% benzonitrile/2% Ph-Cl (v:v) mixture incells measured over the full voltage range.

For the same cells, when voltage was measured over the full voltage range, i.e., 3 to 0 V. The capacitance rise of the dual additive cells early in the test is more pronounced, as shown in FIG. 16, and the cells maintain between 98 and 99.5% of their original capacitance after the 1024 h period. Cells with the single additive system have between 94 and 96% of the original capacitance remaining after the 1024 h period.

The results show that a level of capacitance stability far greater than anything previously demonstrated for a 3 V EDLC can be achieved with the aid of the dual additive system, and that surface area blocking reactions in the activated carbon electrodes have virtually been stopped.

Example 9

Effect of Acidic Conditions on Cellulose Stability

EDLC electrodes were soaked in EDLC electrolytes spiked with 1% (v:v) acetic acid, 1% (v:v) triethylamine or both 1% (v:v) acetic acid and 1% (v:v) triethylamine. A non-spiked control sample was also tested The results are shown in Table 1, below.

TABLE 1

Effect of Acid on stability of Cellulose

| Electrolyte | Electrode | Immersion time (days) | Temperature (° C.) | Observations |
|---|---|---|---|---|
| 1M SBP BF$_4$ in acetonitrile + 5% v:v benzonitrile | Activated carbon based coating on Al current collector, with 1 wt % CMC binder. | 55 | 65 | No change. |
| 1M SBP BF$_4$ in acetonitrile + 5% v:v benzonitrile + 1% v:v acetic acid | Activated carbon based coating on Al current collector, with 1 wt % CMC binder. | 55 | 65 | Delamination of electrode coating from aluminum current collector. |
| 1M SBP BF$_4$ in acetonitrile + 5% v:v benzonitrile + 1% v:v triethylamine | Activated carbon based coating on Al current collector, with 1 wt % CMC binder. | 55 | 65 | No change. |
| 1M SBP BF$_4$ in acetonitrile + 5% v:v benzonitrile + 1% v:v acetic acid + 1% v:v triethylamine | Activated carbon based coating on Al current collector, with 1 wt % CMC binder. | 55 | 65 | Delamination of electrode coating from aluminum current collector, thin white deposit on aluminum current collector. |

The presence of acid resulted in severe de-lamination of the electrode coating from the current collector after several weeks of immersion at 65° C. To add context to this result, it is worth noting that cells which suffered from a high gain in ESR during the course of the accelerated ageing test, although they did not suffer from any significant capacitance loss, often showed a delamination of the carbon coating from the current collector at the positive electrode similar to that observed in the acid-spiked immersion test.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the present disclosure. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical double-layer capacitor, comprising:
   a cathode;
   an anode;
   a separator;
   an electrolyte; and
   an additive comprising a compound of formula I:
   R—X
   wherein:
   R is saturated alkyl, unsaturated alkyl, saturated branched alkyl, aryl, substituted aryl or substituted alkyl;
   X is I, Br, Cl, —SO$_2$F, —SO$_2$CF$_3$, —OCH$_3$, —N(SO$_2$F)$_2$, —N(SO$_2$CF$_3$)$_2$, —N(CN)$_2$, —Si(CH$_3$)$_3$, —O—S(O)$_2$—OCH$_3$, —S(O)$_2$—O—CF$_3$, or tosylate, wherein
   a concentration of the compound of formula I in the electrolyte of the electrochemical double-layer capacitor is selected from the group consisting of about 0.1%, 0.2%, 0.3%, 0.4%, 0.5%, 0.6%, 0.7%, 0.8%, 0.1%, 1%, 2%, 3%, 4%, 5%, 6%, 7%, 8%, and 9% vol %.

2. The electrochemical double-layer capacitor of claim 1, wherein the compound of formula I is an alkyl chloride.

3. The electrochemical double-layer capacitor of claim 1, wherein the compound of formula I is an aryl chloride.

4. The electrochemical double-layer capacitor of claim 1, wherein the compound of formula I is at least one of chlorobenzene, 1-chloro-n-butane, bromobenzene, 1-bromo-n-butane, 1-chloropropane, and 1-bromopropane.

5. The electrochemical double-layer capacitor of claim 4, wherein the compound of formula I is chlorobenzene.

6. The electrochemical double-layer capacitor of claim 4, wherein the compound of formula I is 1-chloro-n-butane.

7. The electrochemical double-layer capacitor of claim 1, wherein the compound of formula I is included in the electrolyte, the electrolyte comprising an ionic species and a solvent.

8. The electrochemical double-layer capacitor of claim 7, wherein the solvent is at least one of acetonitrile, propionitrile, and butyronitrile.

9. The electrochemical double-layer capacitor of claim 7, wherein the solvent is at least one of gamma-butyrolactone, propylene carbonate, ethylene carbonate, dimethyl carbonate, and diethyl carbonate.

10. The electrochemical double-layer capacitor of claim 7, wherein the ionic species is a quaternary ammonium salt.

11. The electrochemical double-layer capacitor of claim 10, wherein the quaternary ammonium salt is at least one of spiro-bipyrrolidinium tetrafluoroborate (SBP $BF_4$), tetraethyl ammonium tetrafluoroborate (TEA TFB), and triethyl (methyl)ammonium tetrafluoroborate.

12. The electrochemical double-layer capacitor of claim 7, wherein the electrolyte further comprises a stabilizer.

13. The electrochemical double-layer capacitor of claim 12, wherein the stabilizer is benzonitrile.

14. The electrochemical double-layer capacitor of claim 1, wherein the compound of formula I is included in the separator.

15. The electrochemical double-layer capacitor of claim 1, wherein the compound of formula I is included in at least one of the anode and the cathode.

16. The electrochemical double-layer capacitor of claim 15, wherein the compound of formula I is included in a binder of at least one of the cathode, and the anode.

17. The electrochemical double-layer capacitor of claim 1, having an operating voltage of greater than about 2.7 V.

18. The electrochemical double-layer capacitor of claim 1, having a rated maximum temperature of greater than about 50° C.

19. An electrochemical double-layer capacitor, comprising:
a cathode;
an anode;
a separator;
an electrolyte;
a stabilizer; wherein the stabilizer is benzonitrile; and
an additive comprising a compound of formula I:

$$R-X \quad (I)$$

wherein:
R is saturated alkyl, unsaturated alkyl, saturated branched alkyl, aryl, substituted aryl or substituted alkyl;
X is I, Br, Cl, $FSO_2$, $CF_3SO^2$, $OCH_3$, $N(SO_2F)_2$, $N(SO_2CF_3)_2$, $N(CN)_2$, $Si(CH_3)_3$, $SO_4CH_3$, $CF_3SO_3$, or tosylate, wherein
a total concentration of the compound of formula I and the stabilizer in the electrolyte of the electrochemical double-layer capacitor is less than or equal to about 10% by volume.

20. The electrochemical double-layer capacitor of claim 19, wherein the total concentrations of the compound of formula I and the stabilizer is about the same.

21. The electrochemical double-layer capacitor of claim 19 wherein the total concentrations of the compound of formula I and the stabilizer is about 5%.

22. The electrochemical double-layer capacitor of claim 19, wherein the compound of formula I is chlorobenzene.

23. The electrochemical double-layer capacitor of claim 19, wherein the compound of formula I is 1-chloro-n-butane.

24. A method of manufacturing an EDLC cell, the method comprising:
disposing a cathode on a positive current collector;
disposing an anode on a negative current collector;
disposing a separator between the positive current collector and the negative current collector to form the EDLC cell;
disposing the EDLC cell in a container; and
infiltrating the EDLC cell with an electrolyte formulation comprising: an ionic species, a solvent, and an additive comprising a compound of formula I:

R—X wherein:
R is saturated alkyl, unsaturated alkyl, unsaturated branched alkyl, aryl, substituted aryl, or substituted alkyl;
X is I, Br, Cl, $FSO_2$, $CF_3SO_2$, $OCH_3$, $N(SO_2F)_2$, $N(SO_2CF_3)_2$, $N(CN)_2$, $Si(CH_3)_3$, $SO_4CH_3$, $CF_3SO_3$, or tosylate, and
a concentration of the compound of formula I in the electrolyte selected from the group consisting of about 0.1%, 0.2%, 0.3%, 0.4%, 0.5%, 0.6%, 0.7%, 0.8%, 0.1%, 1%, 2%, 3%, 4%, 5%, 6%, 7%, 8%, and 9% vol %.

25. The method of claim 24, wherein the electrolyte further comprises a stabilizer.

26. The method of claim 25, wherein the stabilizer is benzonitrile.

27. The method of claim 24, wherein the compound of formula I is formulated to alkylate or arylate tertiary amines present within the EDLC cell.

28. The method of claim 24, wherein the compound of formula I is an alkyl chloride.

29. The method of claim 24, wherein the compound of formula I is an aryl chloride.

30. The method of claim 24, wherein the compound of formula I includes at least one of chlorobenzene, 1-chloro-n-butane, bromobenzene, 1-bromo-n-butane, 1-chloropropane, and 1-bromopropane.

31. The method of claim 30, wherein the compound of formula I is chlorobenzene.

32. The method of claim 24, wherein the solvent includes at least one of acetonitrile, propionitrile, and butyronitrile.

33. The method of claim 24, wherein the ionic species is at least one of spiro-bipyrrolidinium tetrafluoroborate (SBP $BF_4$), tetraethylammonium tetrafluoroborate (TEA TFB), and triethyl(methyl)ammonium tetrafluoroborate.

34. The method of claim 24, wherein the EDLC cell has an operating voltage of greater than about 2.7 volts.

35. The method of claim 24, wherein the EDLC cell has an operating temperature of greater than about 50 degrees Celsius.

* * * * *